US009841119B2

(12) United States Patent
Volovec et al.

(10) Patent No.: US 9,841,119 B2
(45) Date of Patent: Dec. 12, 2017

(54) PILOT VALVE ARRANGEMENT

(71) Applicant: IMI HYDRONIC ENGINEERING INTERNATIONAL SA, Eysins (CH)

(72) Inventors: Peter Volovec, Kapele (SI); Slave Lazov, Celje (SI)

(73) Assignee: IMI HYDRONIC ENGINEERING INTERNATIONAL SA, Eysins (CH)

( * ) Notice: Subject to any disclaimer, the term of this patent is extended or adjusted under 35 U.S.C. 154(b) by 0 days.

(21) Appl. No.: 15/124,598

(22) PCT Filed: Mar. 12, 2015

(86) PCT No.: PCT/EP2015/055136
§ 371 (c)(1),
(2) Date: Sep. 8, 2016

(87) PCT Pub. No.: WO2015/136025
PCT Pub. Date: Sep. 17, 2015

(65) Prior Publication Data
US 2017/0016554 A1 Jan. 19, 2017

(30) Foreign Application Priority Data
Mar. 13, 2014 (EP) .................................... 14159474

(51) Int. Cl.
*F16K 11/20* (2006.01)
*F16K 31/128* (2006.01)
(Continued)

(52) U.S. Cl.
CPC ............ *F16K 31/128* (2013.01); *F16K 1/126* (2013.01); *G05D 16/0663* (2013.01);
(Continued)

(58) Field of Classification Search
CPC .... G05D 16/166; G05D 16/106; F16K 1/126; F16K 31/128; Y10T 137/7758
(Continued)

(56) References Cited

U.S. PATENT DOCUMENTS 1,841,608 A * 1/1932 Kruse ..................... F16K 17/32
137/220
2,914,079 A * 11/1959 Hertrich .................... B04B 9/06
137/219
(Continued)

FOREIGN PATENT DOCUMENTS

FR      1 240 499 A     9/1960
GB        938222 A    10/1963

OTHER PUBLICATIONS

International Search Report (PCT/ISA/210) dated Jun. 11, 2015, by the European Patent Office as the International Searching Authority for International Application No. PCT/EP2015/055136.
(Continued)

*Primary Examiner* — Umashankar Venkatesan
(74) *Attorney, Agent, or Firm* — Buchanan Ingersoll & Rooney P.C.

(57) ABSTRACT

A pilot valve arrangement including a first and second pilot valve parts. The second pilot valve part including a second pilot valve body including a compartment, a low pressure fluid inlet for receiving fluid from the first pilot valve part, and a high pressure fluid inlet, and a fluid outlet for receiving fluid from the low pressure and high pressure inlets via said compartment and providing fluid to a piloted valve. In a first state, the second pilot valve of the pilot valve arrangement provides for a first fluid flow path within the compartment to enable the low pressure fluid inlet to be in fluid communication with the fluid outlet via the first fluid flow path. In a second state, a second fluid flow path within the compart-
(Continued)

ment to enable the high pressure fluid inlet to be in fluid communication with the fluid outlet via the second fluid flow path.

15 Claims, 9 Drawing Sheets

(51) Int. Cl.
*F16K 1/12* (2006.01)
*G05D 16/06* (2006.01)
*G05D 16/10* (2006.01)
*G05D 16/16* (2006.01)

(52) U.S. Cl.
CPC ......... *G05D 16/106* (2013.01); *G05D 16/166* (2013.01); *Y10T 137/7758* (2015.04)

(58) Field of Classification Search
USPC .................................. 251/28, 29; 137/637.2
See application file for complete search history.

(56) References Cited

U.S. PATENT DOCUMENTS

| 3,286,725 | A | | 11/1966 | Elbogen et al. | |
|---|---|---|---|---|---|
| 3,362,424 | A | * | 1/1968 | Smith | B64D 13/02 137/220 |
| 3,481,356 | A | * | 12/1969 | McQueen | B64D 13/04 137/110 |
| 3,734,120 | A | * | 5/1973 | Rowe | G05D 16/106 137/220 |
| 3,792,713 | A | * | 2/1974 | Zadoo | F16K 1/126 137/220 |
| 3,792,716 | A | * | 2/1974 | Sime | F16K 1/126 137/220 |
| 3,825,026 | A | * | 7/1974 | Salerno | F01D 17/145 137/219 |
| 3,865,128 | A | * | 2/1975 | Zadoo | G05D 16/106 137/220 |
| 4,609,008 | A | | 9/1986 | Anderson, Jr. et al. | |
| 6,209,577 | B1 | | 4/2001 | Lai et al. | |
| 8,627,846 | B2 | * | 1/2014 | Grenaway | G05D 16/163 137/491 |

OTHER PUBLICATIONS

Written Opinion (PCT/ISA/237) dated Jun. 11, 2015, by the European Patent Office as the International Searching Authority for International Application No. PCT/EP2015/055136.

* cited by examiner

PILOT VALVE ARRANGEMENT

TECHNICAL FIELD OF THE INVENTION

The present inventive concept relates to a pilot valve arrangement comprising a first pilot valve part and a second pilot valve part, the valve arrangement is arranged for delivering a fluid flow, or being in fluid communication with, to a piloted or main valve. The present inventive concept further relates to a fluid distribution system comprising a pilot valve arrangement.

BACKGROUND OF THE INVENTION

A pilot valve is used to control a limited-flow control feed to a piloted valve, also referred to as a main valve. The piloted valve may e.g. be arranged in risers and branches of heating and cooling systems used in various domestic and industrial applications.

The pilot valve is typically a smaller valve compared to the piloted valve, and is advantageous to use because a small and easily operated feed from the pilot valve may be used to control a much higher pressure or higher flow feed of the piloted valve, which would otherwise require a much larger force to operate. Pilot valves are conventionally positioned externally of the body of the piloted valve and are connected to the body by one or more fluid conduits which have an outlet into the main flow area of the piloted valve chamber.

Pilot valves have external and internal fluid paths enabling fluid flow at different pressures to be fed to/from the piloted valve, or allowing for the piloted valve to be in fluid communication with different fluid paths at different pressures. Theses fluid paths are often complex and require e.g. many internal and external fluid conduits to be connected to and from the pilot valve. Furthermore, for some applications, sealing of the piloted valve when fully closed are troublesome.

The present inventive concept seeks to provide a pilot valve which is less complex and easier to use for regulating the piloted valve. Furthermore, the present inventive concept seeks to provide for a pilot valve which may improve the sealing of the piloted valve when fully closed.

SUMMARY OF THE INVENTION

An object of the inventive concept is to overcome the above problems, and to provide for a pilot valve which, at least to some extent, is less complex than prior art solutions. An object of the inventive concept is also to provide for a pilot valve which may provide for better sealing effect of the piloted valve. This, and other objects, which will become apparent in the following, are accomplished by means of a pilot valve arrangement comprising a first pilot valve part and a second pilot valve part, and a fluid distribution system comprising a pilot valve arrangement defined in the accompanying claims.

The present inventive concept is based on the insight that if a pilot valve arrangement comprises a first pilot valve part having at least a first fluid inlet for receiving fluid at a relatively low pressure, and a second pilot valve part having at least a high pressure inlet for receiving a fluid at a relatively high pressure, the valve arrangement may be arranged to provide for a fluid at the relatively high pressure to be fed to a piloted valve for a better sealing of the piloted valve.

According to at least a first aspect of the present inventive concept, a pilot valve arrangement is provided. The pilot valve arrangement comprises:

a first pilot valve body comprising: at least a first fluid inlet and a first pilot valve fluid outlet;

said second pilot valve part comprising:

a second pilot valve body comprising: a compartment, a low pressure fluid inlet for receiving fluid from the first pilot valve fluid outlet and providing fluid to said compartment, a high pressure fluid inlet for providing fluid to said compartment, and a fluid outlet for receiving fluid from said compartment and providing fluid to a piloted valve;

a valve stem arranged at least partly inside said compartment, said valve stem being configured to control fluid flow from said low pressure fluid inlet to said fluid outlet via said compartment, and configured to control fluid flow from said high pressure fluid inlet to said fluid outlet via said compartment;

wherein said second pilot valve part in a first state provides for a first fluid flow path within said compartment to enable said low pressure fluid inlet to be in fluid communication with said fluid outlet via said first fluid flow path, and wherein said second pilot valve part in a second state provides for a second fluid flow path within said compartment to enable said high pressure fluid inlet to be in fluid communication with said fluid outlet via said second fluid flow path, said second fluid flow path being different from said first fluid flow path.

Hereby, the second pilot valve part may, in the first state, simply provide for a fluid communication between the first pilot valve fluid outlet, and the fluid outlet of the second pilot valve part being fed to a piloted valve, and in the second state, provide for fluid from the high pressure inlet to be fed to the fluid outlet of the second pilot valve part. In the former case, i.e. in the first state, the first pilot valve part is decisive for which fluid flow that is fed to the piloted valve, as the second pilot valve part simply provides for a fluid communication between the first pilot valve part and the piloted valve via the fluid outlet of the second pilot valve part. In the latter case, i.e. in the second state, the second pilot valve part is decisive for which fluid flow that is fed to the piloted valve, as the piloted valve receives a control-feed at a relative higher pressure from the high pressure fluid inlet. Hereby, the fluid from the high pressure fluid inlet may facilitate to better seal the piloted valve and/or facilitate in closing or opening of the piloted valve in a faster manner compared when the valve arrangement is in its first state.

By providing a pilot valve arrangement having a first pilot valve part, and a second pilot valve part, the pilot valve arrangement may be more flexible in use. For example, the first pilot valve part may be a conventional pilot valve, while the second pilot valve part provides for the possibility to feed the piloted valve with a fluid at a higher pressure compared to the first pilot valve part.

Fluid fed to the high pressure fluid inlet may e.g. be bled from the fluid distribution system upstream of the piloted valve.

It should be noted that fluid communication implies that there is a pressurized connection. For example, if the high pressure fluid inlet is in fluid communication with the fluid outlet, the high pressure fluid inlet will be in pressurized connection with the fluid outlet. Hence, the static pressure of fluid at the high pressure fluid inlet will be, essentially, the same as the static pressure of fluid at the fluid outlet.

According to at least one example embodiment, an internal low pressure fluid conduit within said second pilot valve body fluidly connects said low pressure fluid inlet with the compartment, and an internal high pressure fluid conduit within said second pilot valve body fluidly connects said high pressure fluid inlet with the compartment, and an internal fluid outlet conduit within said second pilot valve body fluidly connected said compartment with the fluid outlet.

It should be noted that fluid inside the pilot valve is more or less static, i.e. there is generally no fluid flow inside the pilot valve, but rather redistribution of fluid, and different pressurized connections, due to movement of the separating element and the valve rod. Hence, when stating that there is a fluid flow between two locations, it should be interpreted as that fluid is allowed to flow between the two locations, and that the two locations are in pressurized connection by a fluid communication between the two locations.

According to at least one example embodiment, said compartment is defined at least partly by a first end wall section, a second end wall section arranged opposite to and facing said first end wall section, and a lateral wall section arranged between said first and second end wall sections. According to at least one example embodiment, said compartment has a circular cross section.

According to at least one example embodiment, the lateral wall section comprises several lateral wall portions at least partly defining different compartment portions having different cross sections.

According to at least one example embodiment, the pilot valve arrangement further comprises a movable control body comprised in, and movable within, said compartment,
said movable control body comprising a primary contacting area, a secondary contacting area arranged opposite to said primary contacting area, a cavity for receiving fluid from said high pressure fluid inlet, said cavity being arranged within said movable control body between said primary and secondary contacting areas, and a through hole for receiving said valve stem such that said valve stem is movable within said through hole, said through hole extending from said primary contacting surface to said secondary contacting surface, wherein
when said second pilot valve part is in said first state, said valve stem is arranged to fluidly seal against the inner wall at least partly defining said through hole in said movable control body such that said high pressure fluid inlet is restricted from being in fluid communication with said fluid outlet, and
when said second pilot valve part is in said second state, said valve stem is arranged to fluidly seal against at least a part of the lateral wall section of said compartment such that said low pressure fluid inlet is restricted from being in fluid communication with said fluid outlet.

Hence, when the second pilot valve part is in its first state, fluid from said high pressure fluid inlet is only comprised in said cavity and optionally in said through hole, within said movable control body within said compartment.

According to at least one example embodiment, the valve arrangement further comprises a first spring arranged at least partly inside said compartment, and wherein said first spring is arranged between said primary contacting area of said movable control body and the first end wall section of said compartment facing said primary contacting area, in order for said first spring to exert a first spring force on said movable control body.

The first spring, together with the forces from the fluids acting on the movable control body, prevents the movable control body from oscillating.

According to at least one example embodiment, the valve arrangement further comprises a second spring arranged at least partly inside said compartment, wherein said second spring is arranged between a head of said valve stem and said primary contacting area of said movable control body in order for said second spring to exert a second spring force on said movable control body.

The first spring may be an outer spring, and the second spring may be an inner spring arranged inside of the first spring.

According to at least one example embodiment, the movable control body is supported inside said compartment by at least one of the first and second springs.

According to at least one example embodiment, said movable control body is arranged in a primary position when said second pilot valve part is in its first and second states, and arranged in secondary position when said second pilot valve part is in a third state, said third state being defined by that
said valve stem is arranged to fluidly seal against the inner wall at least partly defining said through hole in said movable control body such that said high pressure fluid inlet is restricted from being in fluid communication with said fluid outlet, and
said valve stem is arranged to fluidly seal against at least a part of the lateral wall section of said compartment such that said low pressure fluid inlet is restricted from being in fluid communication with said fluid outlet.

Hence when said second pilot valve part is in its first and second states, a combined force applied to said primary contacting area by said first and second springs and the static pressure from fluid from said low pressure fluid inlet holds the movable control body in a primary position, and wherein when said second pilot valve part is in said third state, a force applied to said secondary contacting area by a static pressure from fluid from said high pressure fluid inlet holds the movable control body in a secondary position.

According to at least one example embodiment, the valve arrangement further comprises a first sealing member and a second sealing member arranged inside said compartment, and wherein said compartment comprises:
a first end wall section, a second end wall section arranged opposite to and facing said first end wall section, and a lateral wall section arranged between said first and second end wall sections,
a first compartment portion being at least partly defined by said primary contacting area of said movable control body and the first end wall section of said compartment facing said primary contacting area,
a second compartment portion being at least partly defined by said second end wall section and a portion of the lateral wall section extending between said second end wall section and said first sealing member, and
a third compartment portion comprising said first and second sealing member, and being at least partly defined by a portion of the lateral wall section extending between said first and second sealing members, and said secondary contacting area of said movable control body,
said first compartment portion being arranged to receive fluid from said low pressure fluid inlet to allow for fluid in said first compartment portion to exert a force on said primary contacting area, said second compartment portion being arranged to be in fluid communication with said first compartment portion, and said third compartment portion being arranged to be in fluid communication with said fluid outlet to allow for fluid in said third compartment portion to exert a force on said secondary contacting area.

The first and second sealing members may e.g. be arranged to said lateral wall section.

In said second state, said cavity is in fluid communication with said high pressure fluid inlet and said third compartment portion via said through hole of said movable control body.

In said third state, said high pressure fluid inlet is restricted from being in fluid communication with said first and second compartment portions by said movable control body, i.e. said first/second fluid path are closed According to at least one example embodiment, the only fluid flow path for fluid from said high pressure fluid inlet to said fluid outlet is via said cavity, said through hole and said third compartment portion. Hence, said high pressure fluid inlet, and said cavity are fluidly sealed from said first compartment portion, e.g. by sealing members arranged in said through hole of said movable control body and between said movable control body and the lateral wall of said compartment.

According to at least one example embodiment, said movable control body is arranged inside said compartment such that said primary contacting area faces said first compartment portion and said secondary contacting area faces said third compartment portion.

According to at least one example embodiment, said movable control body is configured to be moved from its primary position to its secondary position when a first force applied to the primary contacting area by said first and second springs and fluid in said first compartment portion is smaller than a second force applied to said secondary contacting area by fluid in said third compartment portion.

According to at least one example embodiment, said valve stem comprises at least a first valve stem portion, a second valve stem portion, and a third valve stem portion arranged between said first and second valve stem portions, wherein each of said first and second valve stem portions has a diameter larger than a diameter of said third valve stem portion.

According to at least one example embodiment, when said second pilot valve part is in its first state:
said first valve stem portion is arranged to fluidly seal against the inner wall at least partly defining said through hole in said movable control body in order for fluid in said cavity in said movable control body to be restricted from being in fluid communication with said third compartment portion, and
said third valve stem portion is arranged to be at least partly located in said third compartment portion in order for fluid in said second compartment portion to be in fluid communication with said third compartment portion via said first fluid flow path, said first fluid path being at least partly defined by at least a part of the lateral wall section of said compartment and at least a part of said third valve stem portion;

and wherein when said second pilot valve part is in its second state:
said second valve stem portion is arranged to fluidly seal against the lateral wall section of said compartment in order for fluid in said second compartment portion to be restricted from being in fluid communication with said third compartment portion, and
said third valve stem portion is arranged to be at least partly located in said third compartment portion in order for fluid in said cavity of said movable control body to be in fluid communication with said third compartment portion via said second fluid flow path, said second fluid path being at least partly defined by at least a part of the inner wall defining said through hole in said movable control body and at least a part of said third valve stem portion;

and wherein when said second pilot valve part is in its third state:
said first valve stem portion is arranged to fluidly seal against the inner wall at least partly defining said through hole in said movable control body in order for fluid in said cavity to be restricted from being in fluid communication with said third compartment portion, and
said second valve stem portion is arranged to fluidly seal against the lateral wall section of said compartment in order for fluid in said second compartment portion to be restricted from being in fluid communication with said third compartment portion, such that none of the low pressure and high pressure fluid inlets are in fluid communication with said fluid outlet.

According to at least one example embodiment, said valve stem comprises a valve stem conduit for fluidly connecting said first compartment portion with said second compartment portion.

Hereby, the third compartment portion may be arranged between said cavity in fluid communication with the high pressure fluid inlet, and said second compartment portion in fluid communication with the first compartment portion.

According to at least one example embodiment, said first pilot valve part further comprises:
a chamber, wherein said at least first fluid inlet is arranged to provide fluid to said chamber, and wherein said first pilot valve fluid outlet is arranged to receive fluid from said chamber, and
a valve rod configured to control fluid flow from said at least first fluid inlet to said pilot valve fluid outlet via said chamber,
wherein said valve rod is connected to, and movable with, said valve stem.

Hence, the position of the valve rod in said first pilot valve part influences the position of the valve stem and hence, the fluid flow through the second pilot valve part. According to at least one example embodiment, said valve rod is made in one piece with said valve stem.

According to at least one example embodiment, said first pilot valve part further comprises:
a second fluid inlet arranged inside said first pilot valve body, said second fluid inlet being arranged to provide fluid to said chamber, and wherein
said valve rod is arranged at least partly inside said chamber, said valve rod being configured to control fluid flow from said first fluid inlet to said first pilot valve fluid outlet via said chamber, and configured to control fluid flow from said second fluid inlet to said first pilot valve fluid outlet via said chamber;
a separating element being connected to, and movable with said valve rod, said separating element having a first fluid contacting area, and a second fluid contacting area arranged on an opposite side to said first fluid contacting area,
said first fluid contacting area being configured to be in fluid communication with said first fluid inlet for applying a first force to said separating element, and
said second fluid contacting area being configured to be in fluid connection with said second fluid inlet for applying a second force to said separating element;
wherein a difference between the first and second forces controls the movement of the separating element and the valve rod in such a way that said valve rod in at least a first position provides for a fluid connection between said first fluid inlet and said first pilot valve fluid outlet; and in at least a second position provides for a fluid connection between said second fluid inlet and said first pilot valve fluid outlet.

Hereby, internal fluid flow paths inside at least the first pilot valve part, that is, fluid from the first fluid inlet and fluid from the second fluid inlet, may be used to control the separating element and the valve rod. Thus, the pilot valve arrangement can be made less complex, and be more flexible in use by providing for these internal fluid flow paths. The valve rod then controls which of the first and second fluid inlets which are allowed to be in fluid communication with the first pilot valve fluid outlet. That is, fluid from the first and second fluid inlets, which are used to control the piloted valve, are also used to control the valve rod and the valve stem in the piloted valve arrangement. Hence, the external fluid conduits providing fluid flow to the pilot valve, may be reduced. Furthermore, regardless of the position of the valve rod, i.e. whether fluid from the first fluid inlet or fluid from the second fluid inlet is allowed to be in fluid communication with the first pilot part fluid outlet, the first fluid contacting area is arranged to in fluid communication with said first fluid inlet and the second fluid contacting area is arranged to be in fluid communication with said second fluid inlet.

According to at least one example embodiment, a first internal fluid conduit within said first pilot valve body fluidly connects said first fluid inlet with the chamber, a second internal fluid conduit within said first pilot valve body fluidly connects said second fluid inlet with the chamber, and a third internal fluid conduit within said first pilot valve body fluidly connected said chamber with the first pilot valve fluid outlet.

According to at least one example embodiment, said chamber comprises a first chamber portion arranged to receive fluid from said first fluid inlet, and a second chamber portion arranged to receive fluid from said second fluid inlet, wherein when said valve rod is in said first position, said first fluid inlet, said first chamber portion and said first pilot valve fluid outlet are in fluid communication with each other, and said second fluid inlet is restricted from being in fluid communication with said first pilot valve fluid outlet by said valve rod; and wherein when said valve rod is in said second position said second fluid inlet, said second chamber portion and said first pilot valve fluid outlet are in fluid communication with each other, and said first fluid inlet is restricted from being in fluid communication with said first pilot valve fluid outlet by said valve rod.

According to at least one example embodiment, said chamber comprises a third chamber portion arranged between said first and second chamber portions, and wherein said first pilot valve fluid outlet is arranged to receive fluid from said chamber via said third chamber portion.

According to at least one example embodiment, said valve rod comprises a fluid conduit for guiding a fluid flow from said first chamber portion to said first fluid contacting area of the separating element in such a way that said first fluid inlet is in fluid communication with said first fluid contacting area.

Hereby, an internal fluid path within the first pilot valve part is provided for. According to at least one example embodiment, the valve rod is hollow and provided for an internal fluid conduit within the valve rod. Thus, the first pilot valve part may be referred to as a tree-way pilot valve part providing for a first fluid path between the first fluid inlet and the first pilot valve fluid outlet, a second fluid path between the second fluid inlet and the first pilot valve fluid outlet, and a third fluid path between the first fluid inlet and the first fluid contacting area, via the fluid conduit of the valve rod.

According to at least one example embodiment, said fluid conduit of the valve rod extends through said separating element.

Hereby, fluid from the first fluid inlet may be in fluid communication with the first fluid contacting area of the separating element, via the valve rod. This provides for a beneficial internal fluid path within the first pilot valve part.

According to at least one example embodiment, said valve rod has at least a first valve rod portion, a second valve rod portion, and a third valve rod portion arranged between said first and second valve rod portions, each of said first and second valve rod portions having a diameter larger than a diameter of said third valve rod portion.

The third valve rod portion may for example be waist shaped, or hour-glass shaped, and the first and the second valve rod portions may have a constant diameter. According to at least one example embodiment, a diameter of the first valve rod portion is larger than a diameter of the second valve rod portion. According to at least one example embodiment, a diameter of the first valve rod portion is smaller than a diameter of the second valve rod portion. According to at least one example embodiment, a diameter of the first valve rod portion is of the same size as a diameter of the second valve rod portion.

The first, second and third valve rod portions may have a circular cross section, the first and the second valve rod portions may e.g. be cylindrically shaped. Furthermore, the chamber, and the first, second and third chamber portions may have a circular cross section.

According to at least one example embodiment, said separating element comprises a piston. According to at least one example embodiment, said separating element comprises a membrane.

It should be understood that the pilot valve arrangement may comprise further parts, such as further pilot valve parts than the first and the second pilot valve parts described here.

According to at least a second aspect of the present inventive concept, a fluid distribution system is provided. The fluid distribution system comprises: a pilot valve arrangement according to the first aspect of the present inventive concept, a first fluid conduit for guiding a fluid to said at least first fluid inlet, a second fluid conduit for guiding a fluid to said high pressure fluid inlet, and a third fluid conduit for guiding fluid away from said fluid outlet, wherein a static pressure of fluid in said first fluid conduit is lower compared to a static pressure of fluid in said second fluid conduit.

According to at least one example embodiment, said fluid distribution system is arranged to supply fluid to a load, said fluid distribution system comprising:

said load, a control unit, a supply line for supplying fluid to said load, an intermediate line for transporting fluid from said load to said control unit, a return line for transporting fluid from said load, a main valve arranged on said supply line, and a pilot valve arrangement according to any one claims 1-12 for piloting said main valve, wherein a static pressure of fluid in said supply line is higher than a static pressure of fluid in said intermediate line, and wherein a static pressure of fluid in said intermediate line is higher than a static pressure of fluid in said return line, wherein said first fluid inlet to said pilot valve arrangement is fluidly connected to said return line and said high pressure inlet is fluidly connected to said supply line.

According to at least one example embodiment, said second fluid inlet to said pilot valve arrangement is fluidly connected to said intermediate line.

According to at least a third aspect of the present inventive concept, a valve arrangement is provided. The valve arrangement comprises a first pilot valve part and a second pilot valve part described in relation to the first aspect of the present inventive concept or a fluid distribution system as described in relation to the second aspect of the present inventive concept, and a piloted valve in fluid communication with the first and second pilot valve parts of the first or second aspects of the present inventive concept.

The piloted valve may be any type of valve arranged to be connected to a pilot valve.

BRIEF DESCRIPTION OF THE DRAWINGS

The present inventive concept will now be described in more detail, with reference to the appended drawings showing example embodiments, wherein.

DETAILED DESCRIPTION OF THE DRAWINGS

In the following description, the present inventive concept is described with reference to a pilot valve arrangement comprising a first pilot valve part and a second pilot valve part. The present inventive concept is also described with reference to a fluid distribution system comprising such pilot valve and/or such pilot valve arrangement and a piloted valve.

Figure 1:
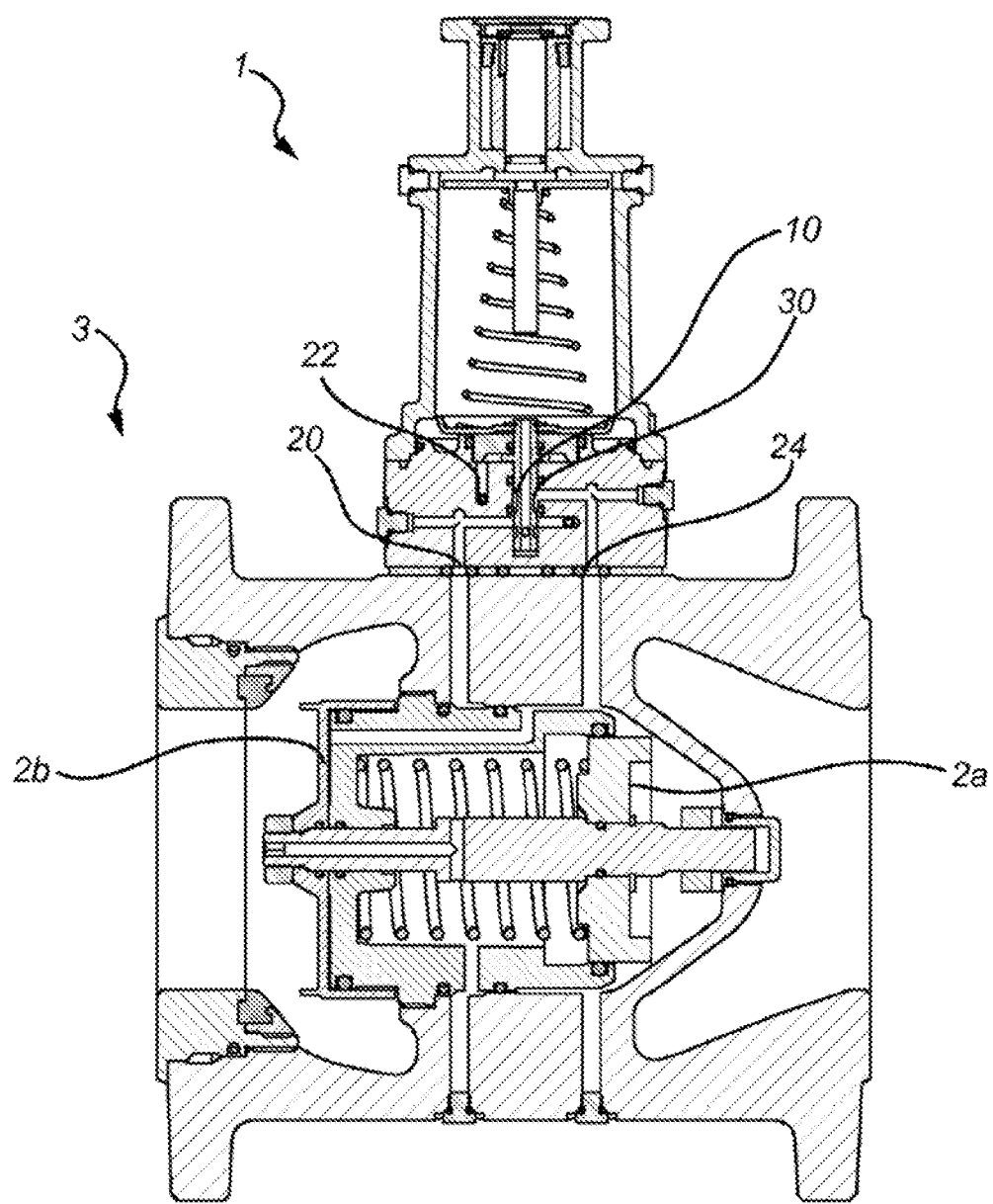
FIG. 1 illustrates in cross section a pilot valve or a first pilot valve part and a piloted valve according at least one example embodiment.

FIG. 1 illustrates in cross section a pilot valve 1 and a piloted valve 3, also referred to as a main valve 3. The pilot valve 1 is typically a smaller valve 1 compared to the piloted valve 3, and is used to control a limited-flow control feed to the piloted valve 3. The pilot valve 1 is advantageous to use because a small and easily operated feed from the pilot valve 1 may be used to control a much higher pressure or higher flow feed of the piloted valve 1, which would otherwise require a much larger force to operate.

The pilot valve 1 in FIG. 1 comprises a chamber 10, a first fluid inlet 20 arranged to be fluidly fed from an internal fluid flow of the piloted valve 3, and a second fluid inlet 22 arranged to be fluidly fed from an external fluid flow (not shown), wherein both the first and the second fluid inlets 20, 22 are arranged to provide fluid to the chamber 10. The pilot valve 1 further comprises a fluid outlet 24 for receiving fluid from the chamber 10 and for providing a fluid control feed to the piloted valve 3. As illustrated in FIG. 1, a valve rod 30 arranged at least partly inside the chamber 10 is arranged to control fluid flow from the first and second fluid inlets 20, 22 to the fluid outlet 24.

The piloted valve 3, or the main valve 3, may be any type of valve arranged to be connected to a pilot valve. In FIG. 1, the piloted valve is a two-plug valve having two separated force contacting surfaces 2a, 2b which the fluid control feed from the pilot valve 1 may act on. The piloted valve 3 may be a normally open valve. According to one example, the piloted valve 3 may be a normally closed valve.

Figure 2A:
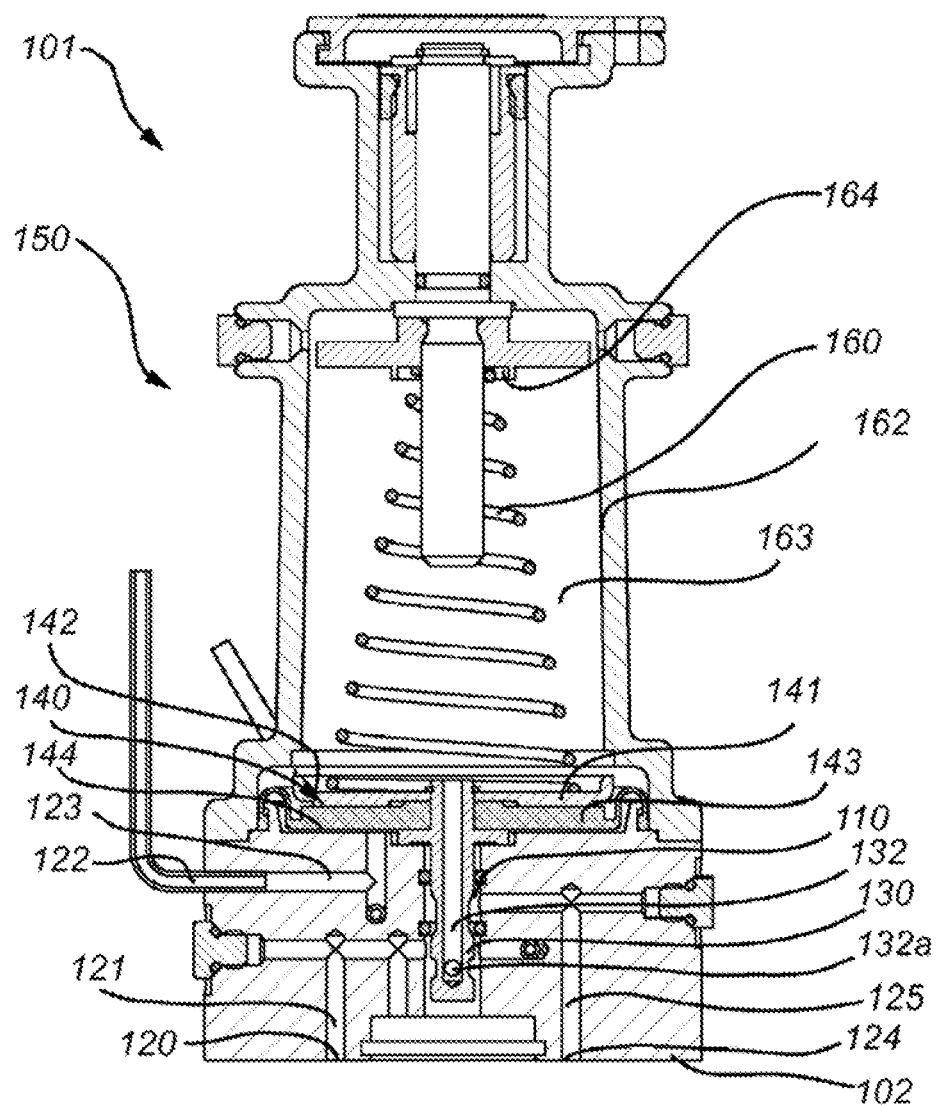
FIG. 2a illustrates a pilot valve or a first pilot valve part in cross section according to at least one example embodiment.

FIG. 2a illustrates a pilot valve 101 in cross section, similar to the pilot valve 1 shown in FIG. 1, but in greater detail. The pilot valve 101 in FIG. 2a comprises a first pilot valve body 102 having a chamber 110, a first fluid inlet 120 and a second fluid inlet 122 for providing fluid to the chamber 110 via a first internal fluid conduit 121 and a second internal fluid conduit 123. The first pilot valve body 102 further comprises a pilot valve fluid outlet 124 for receiving fluid from the chamber 110 via an internal pilot valve fluid outlet conduit 125, and providing a control feed to a piloted valve (as shown in FIG. 1). As illustrated in FIG. 2a, a valve rod 130 is arranged at least partly inside the chamber 110 for controlling fluid flow from the first and second fluid inlets 120, 122 to the fluid outlet 124 of the pilot valve, via the chamber 110.

The pilot valve 101 in FIG. 2a further comprises a separating element 140 being connected to, and movable with the valve rod 130. In FIG. 2a, the separating element 140 comprises a disc 141 having a first fluid contacting area 142, and a membrane 143 having a second fluid contacting area 144. The first fluid contacting area 142 of the separating element 140 is arranged at least partly opposite to the second fluid contacting area 144. According to at least one example embodiment, the separating element 140 may comprise a piston instead of the membrane 140. Furthermore, even though the separating element 140 in FIG. 2a comprises two parts 141, 143, the separating element 140 may comprise only one part.

The pilot valve 101 further comprises a pilot spring 160 housed in a pilot spring housing 162 defining a pilot spring chamber 163, the pilot spring 160 being arranged inside the pilot spring chamber 163, between a wall portion 164 in the pilot spring housing 162 and the first fluid contacting area 142. The wall portion 164 is facing the first fluid contacting area 142. Furthermore, a valve housing 150 comprises the valve body 102, the valve rod 130, the separating element 140, the pilot spring 160 and the pilot spring housing 162.

As illustrated in FIG. 2a, a valve rod fluid conduit 132 is arranged inside the valve rod 130 and extends from the chamber 110, via a valve rod fluid conduit inlet 132a in the valve rod 130, through the valve rod 130 and through the separating element 140, whereby fluid from the first fluid inlet 120 is enabled to be in fluid communication with fluid in the pilot spring chamber 163. Hereby, the first fluid inlet 120 is enabled to be in fluid communication with the first fluid contacting area 142 within the pilot spring housing 162. Furthermore, the separating element 140 fluidly separates fluid from the second fluid inlet 122, which fluid exerts a pressure on the second fluid contacting area 144, from fluid from the first fluid inlet 120, which fluid exerts a pressure on the first fluid contacting area 142. Hence, fluid from the second fluid inlet 122 is fluidly separated from fluid in the pilot spring chamber 163 by the separating element 140.

The chamber 110 and the valve rod 130 have preferably circular cross sections. Hereby, sealing elements such as o-rings may be used to seal different chamber portions from each other. However, other shapes and other cross sections of the chamber 110 and the valve rod 130 are possible to use.

The function of the pilot valve 101 of FIG. 2a will now be described in more detail.

As fluid from the first fluid inlet 120 is enabled to be in fluid communication with the first fluid contacting area 142 of the separating element 140, the fluid may exert a pressure on the first fluid contacting area 142 in order for a first force to be applied to the separating element 140. Fluid from the second fluid inlet 122 is enabled to be in fluid communication with the second fluid contacting area 144 of the separating element 140 and may thereby exert a pressure on the second fluid contacting area 144 to apply a second force to the separating element 140. Since the first fluid contacting area 142 is arranged on an opposite side to the second fluid contacting area 144, the first and the second force act on the separating element 140 in opposite directions. The first force acts on the separating element 140 in a direction from the first fluid contacting area 142 at least partly towards the second fluid contacting area 144, and the second force acts on the separating element in a direction from the second fluid contacting area 144 at least partly towards the first fluid contacting area 142.

As illustrated in FIG. 2a, the pilot spring 160 arranged in the pilot spring housing 162 between the wall portion 164 and the first fluid contacting area 142, acts on the separating element 140 with a pilot spring force in at least partly the same direction as the first force. Hence, a combined force comprising the first force and the pilot spring force act on the separating element 140 in one direction, and the second force act on the separating element 140 in at least partly, an opposite direction. A difference between the combined force and the second force will normally cause a movement and/or a change in the movement of the separating element 140 and the valve rod 130, as the separating element 140 is arranged to move together with the valve rod 130.

In a first position of the valve rod 130, fluid from the first fluid inlet 120 is enabled to be in fluid communication with the pilot valve fluid outlet 124, and in a second position of the valve rod 130, fluid from the second fluid inlet 122 is enabled to be in fluid communication with the pilot valve fluid outlet 124. It should be understood that the valve rod 130 may be slightly moved within each of the first and second positions, as the first and the second positions are defined by which fluid inlet 120, 122 that is in fluid communication with the pilot valve fluid outlet 124. There is also an intermediate position of the valve rod 130, between its first and second positions where none of the fluid inlets 120, 122 are in fluid communication with the pilot valve fluid outlet 124. The different positions of the valve rod 130 will be described in greater detail with reference to FIGS. 3-7.

Figure 2B:
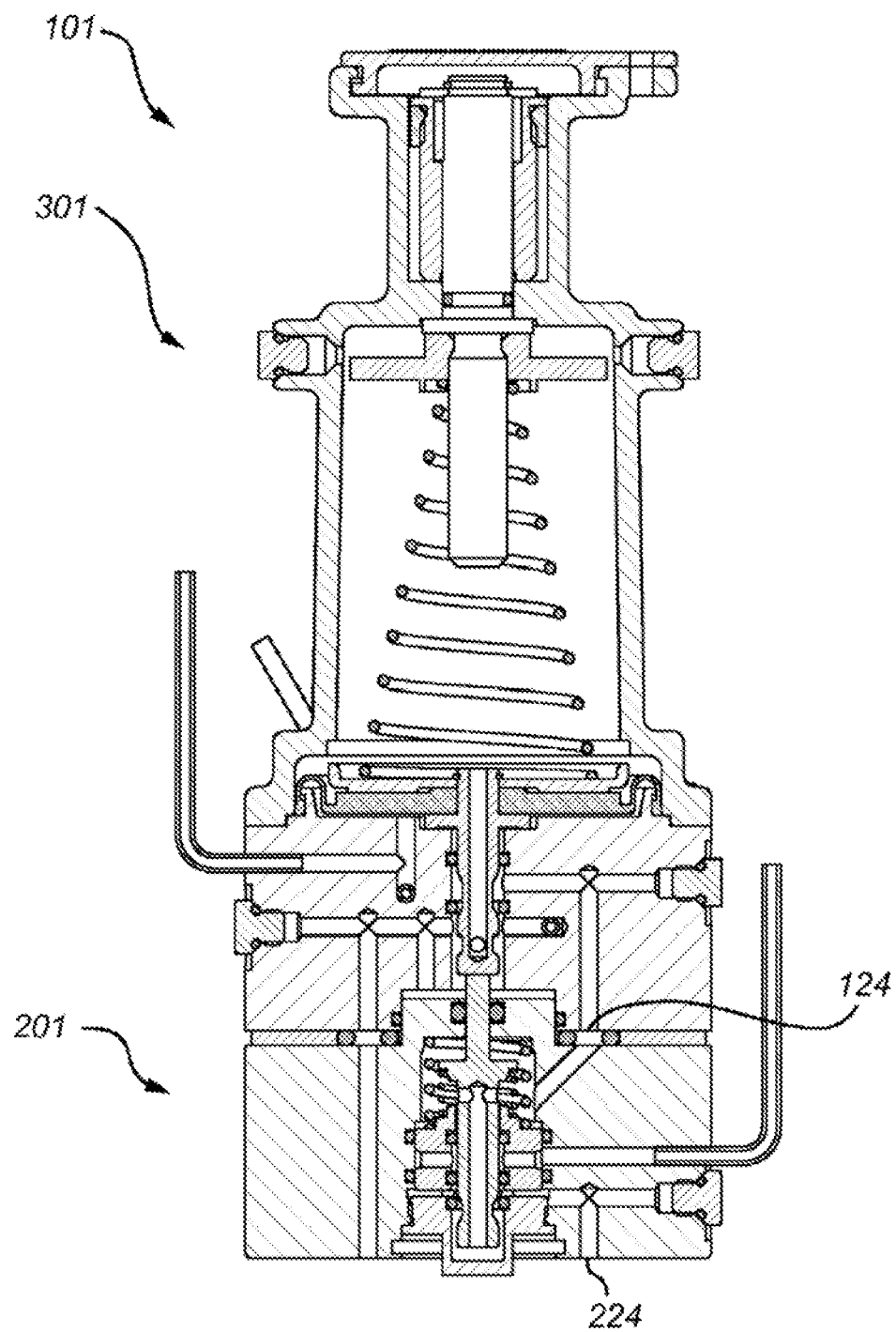
FIG. 2b illustrates a pilot valve arrangement comprising a first pilot valve part and a second pilot valve part according to at least one example embodiment of the inventive concept.

FIG. 2b illustrates a pilot valve arrangement 301 comprising a first pilot valve part 101, described as the pilot valve 101 in FIG. 2a, and a second pilot valve part 201 arranged between the first pilot valve part 101 and a piloted valve (the piloted valve 3 shown only in FIG. 1). The fluid outlet 124 from the first pilot valve part 101, hereafter referred to as the first pilot valve fluid outlet 124, is fed to the second pilot valve part 201 instead of directly to a piloted valve as shown in FIG. 1. A fluid outlet 224 of the second pilot valve part 201 is fed to the piloted valve.

The first pilot valve part 101 and the second pilot valve part 201 as described with reference to FIGS. 2a-2b will now be described in further detail with reference to FIGS. 3-7. First, the pilot valve 101, or the first pilot valve part 101, will be described, second, the second pilot valve part 201 will be described, and third, the structure and function of the pilot valve arrangement 301 comprising the first pilot valve part 101 and the second pilot valve part 201 will be described. The first valve first valve part 101 in FIGS. 2a-2b is the same as the first valve part 101 in FIGS. 3-7, and the second valve part 201 in FIG. 2b is the same as the second valve part 201 in FIG. 3-7, hence, the same reference numerals will be used for referring to the same features. Thus, FIGS. 3-7 disclose different states and valve rod positions of the first and second valve parts 101, 102 of FIGS. 2a-2b. Therefore, in order to facilitate the reading comprehension, some reference numerals are only indicated in the Figure where first described.

Figure 3:
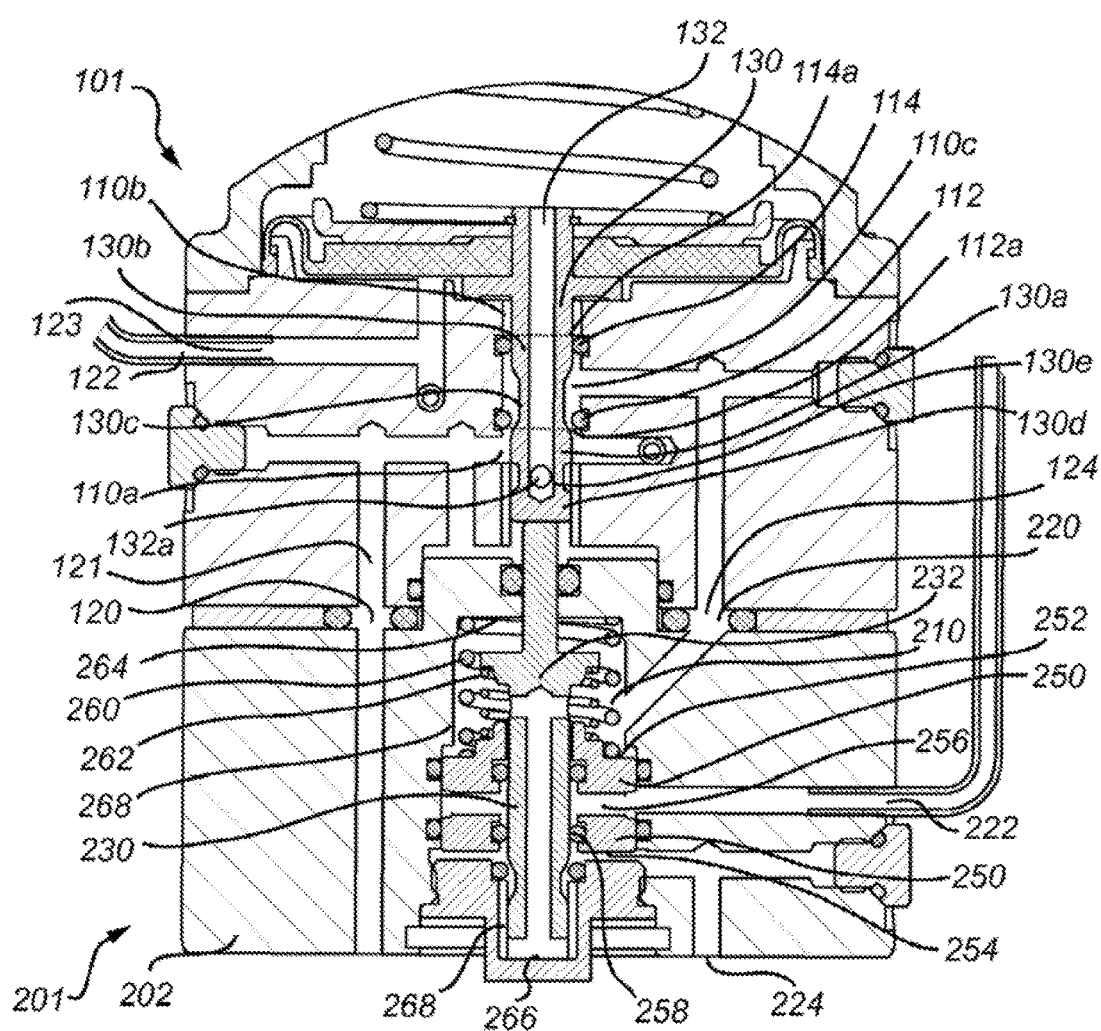
FIGS. 3-7 illustrates different states and valve rod/valve stem positions of a pilot valve arrangement comprising a first pilot valve part and a second pilot valve part according to at least one example embodiment of the inventive concept.

As indicated in FIG. 3, the first pilot valve part 101 in FIGS. 3-7 comprises a first sealing element 112 in the form of an o-ring 112, and a second sealing element 114 in the form of an o-ring 114. The first sealing element 112 is arranged within the chamber 110 and a first geometrical chamber cross section 112a tangents the first sealing element 112. The second sealing element 114 is arranged within the chamber 110 and a second geometrical chamber cross section 114a tangents the second sealing element 114. The chamber 110 comprises a first chamber portion 110a, a second chamber portion 110b and a third chamber portion 110c arranged between the first and second chamber portions 110a, 110b. The third chamber portion 110c comprises both the first and the second sealing elements 112, 114 and is at least partly defined by the portion 110c of the chamber 110 extending between first geometrical chamber cross section 112a and the second geometrical chamber cross section 114a. The first chamber portion 110a is at least partly defined by the portion 110a of the chamber 110 extending between the third chamber portion 110c and the first fluid inlet 120, or an inlet of the first internal fluid inlet conduit 121 to the chamber 110. The second chamber portion 110b is at least partly defined by the portion 110b of the chamber 110 extending between the third chamber portion 110c and the second fluid inlet 122 or an inlet of the second internal fluid inlet conduit 123 to the chamber 110. The first chamber portion 110a is arranged to receive fluid from the first fluid inlet 120, and the second chamber portion 110b is arranged to receive fluid from the second fluid inlet 122, while the third chamber 110c portion is arranged to provide fluid to the first pilot valve fluid outlet 124.

As shown in FIG. 3, the valve rod 130 comprises at least a first valve rod portion 130a, a second valve rod portion 130b, and a third valve rod portion 130c arranged between the first and second valve rod portions 130a, 130b. A diameter of each of the first and second valve rod portions 130a, 130b has a diameter larger than a diameter of the third valve rod portion 130c. According to at least one example embodiment, the first and second valve rod portions 130a, 130b have the same diameter. According to at least one example embodiment, the first and second valve rod portions 130a, 130b have different diameters. The third valve rod portion 130c may have a waist shape, or hour-glass shape, as shown in FIGS. 3-7, while the first and the second valve rod portions 130a, 130b may have a circular cross section with a constant diameter, The valve rod 130 in FIGS. 3-7 further comprises a fourth valve rod portion 130d and a fifth valve rod portion 130e arranged between the first and the fourth valve rod portions

130a, 130d, A diameter of each of the first and fourth valve rod portions 130a, 130d has a diameter larger than a diameter of the fifth valve rod portion 130e. The fifth valve rod portion 130e may, similar to the third valve rod portion 130c, have a waist shape, or hour-glass shape, while the fourth valve rod portion 130d may have a circular cross section with a constant diameter. By having the valve rod fluid conduit inlet 132a arranged in the fifth valve rod portion 130e, fluid from the first fluid inlet 120 may be in fluid communication with the valve rod fluid conduit 132 within the valve rod 130.

The different positions of the valve rod 130 will now be described in further detail with reference to FIGS. 3-7. In the examples below, it is assumed that a static pressure of fluid in the first fluid inlet 120 is smaller than a static pressure of the fluid in the second fluid inlet 122.

When the combined force acting on the separating element 140 (indicated in FIG. 2a) in a direction from the first fluid contacting area 142 at least partly towards the second fluid contacting area 143 by fluid in fluid communication with the first fluid inlet 120, and the pilot spring force of the spring, is larger than the second force acting on the separating element 140 in an at least partly opposite direction, the valve rod 130 will be in its first position as shown in FIG. 3. Here, the first fluid inlet 120, the first chamber portion 110a and the first pilot valve fluid outlet 124 are in fluid communication with each other, while the second fluid inlet 122 is restricted from being in fluid communication with the first pilot valve fluid outlet 124 by the valve rod 130 fluidly sealing against the second sealing element 114. In other words, the second chamber portion 110b is fluidly sealed from the third chamber portion 110c by a sealing contact between the valve rod 130 and the second sealing element 114, According to at least one example embodiment, the third valve rod portion 130c is arranged to be at least partly located in the first chamber portion 110a such that the first fluid inlet 120 is in fluid communication with the first pilot valve fluid outlet 124 via the first and third chamber portions 110a, 110c, and the second valve rod portion 130b is arranged to be at least partly located in both the second chamber 110b portion and the third chamber portion 110c such that the second fluid inlet 122 is restricted from being in fluid communication with the first pilot valve fluid outlet 124.

Figure 5:
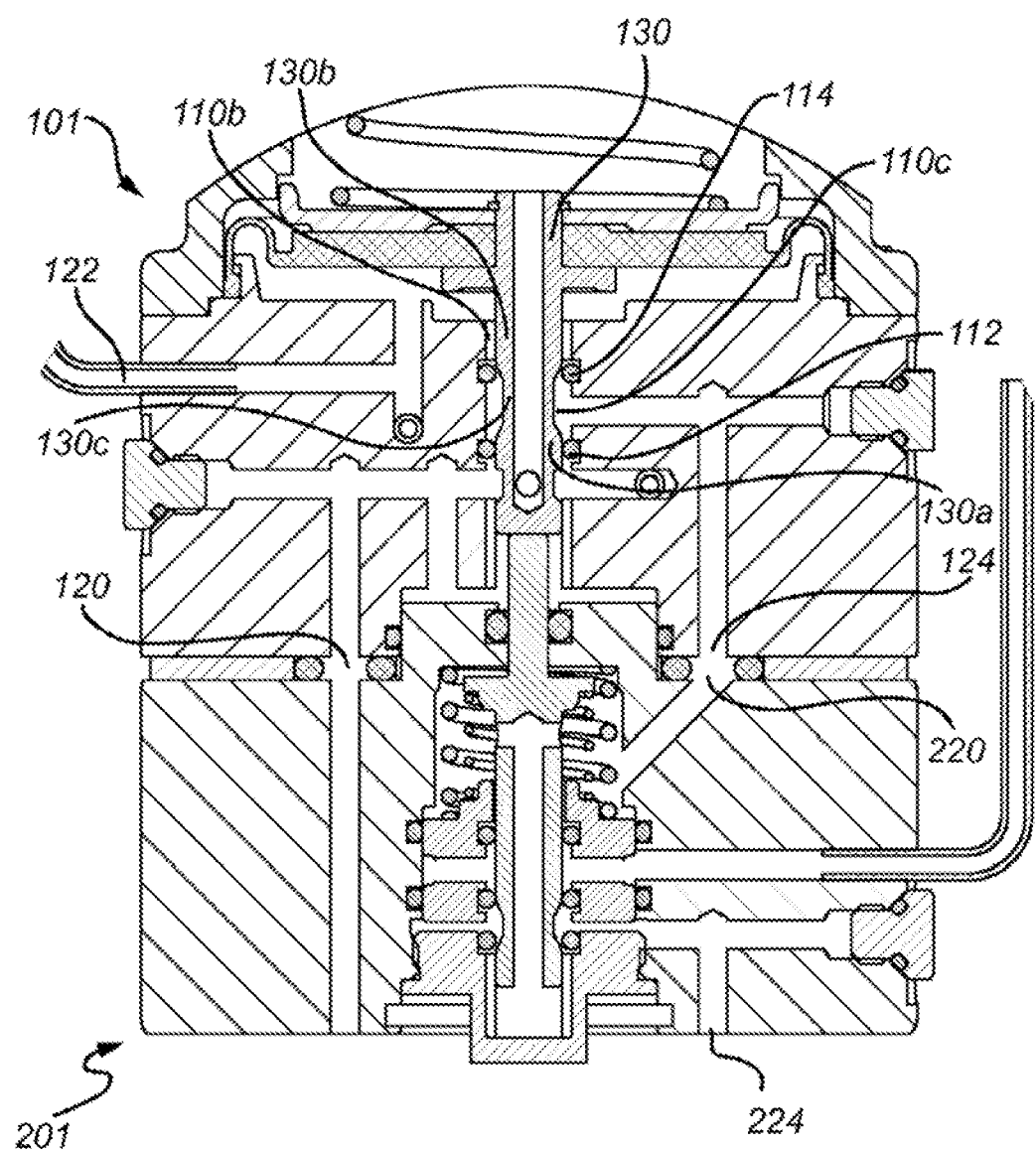
Figure 6:
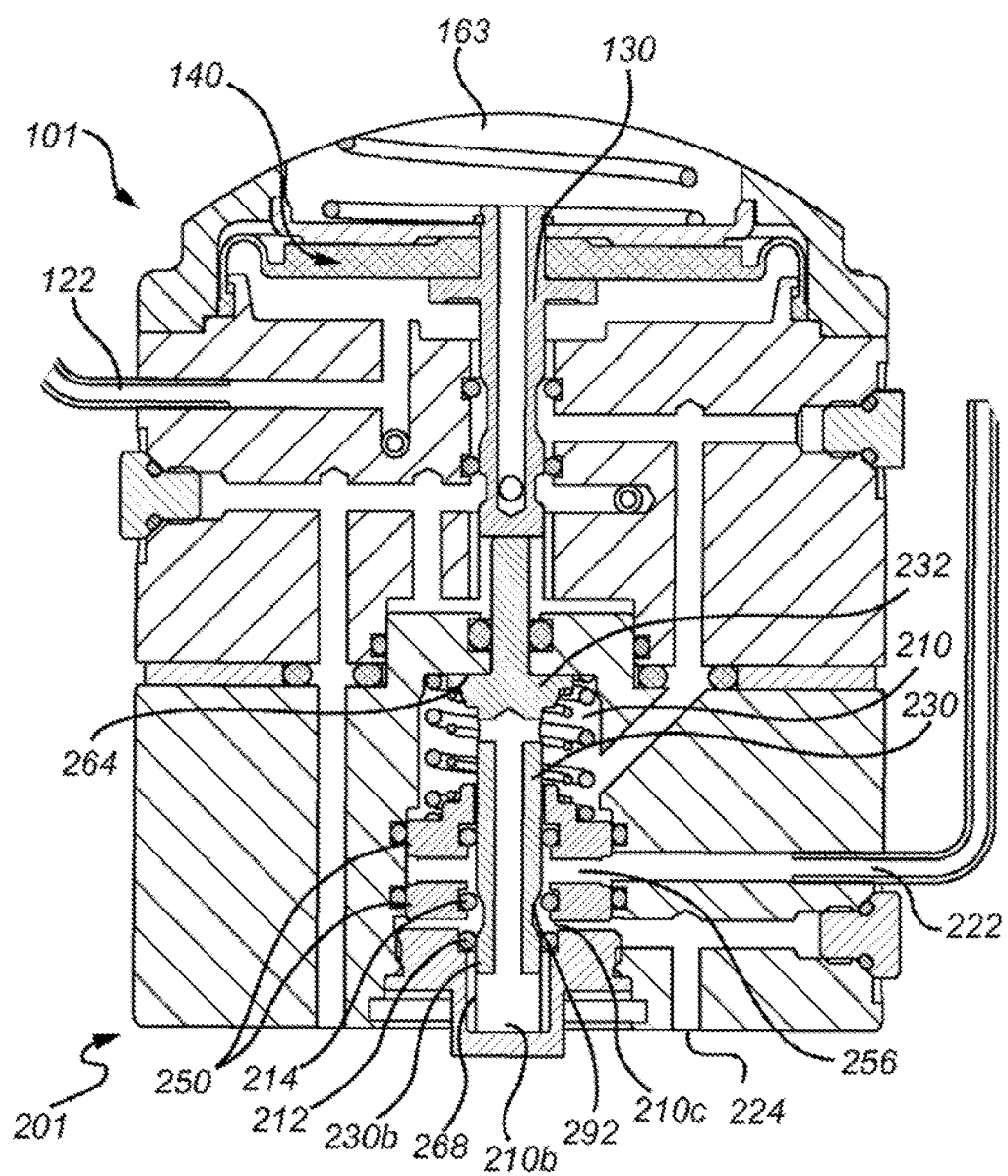
Figure 7:
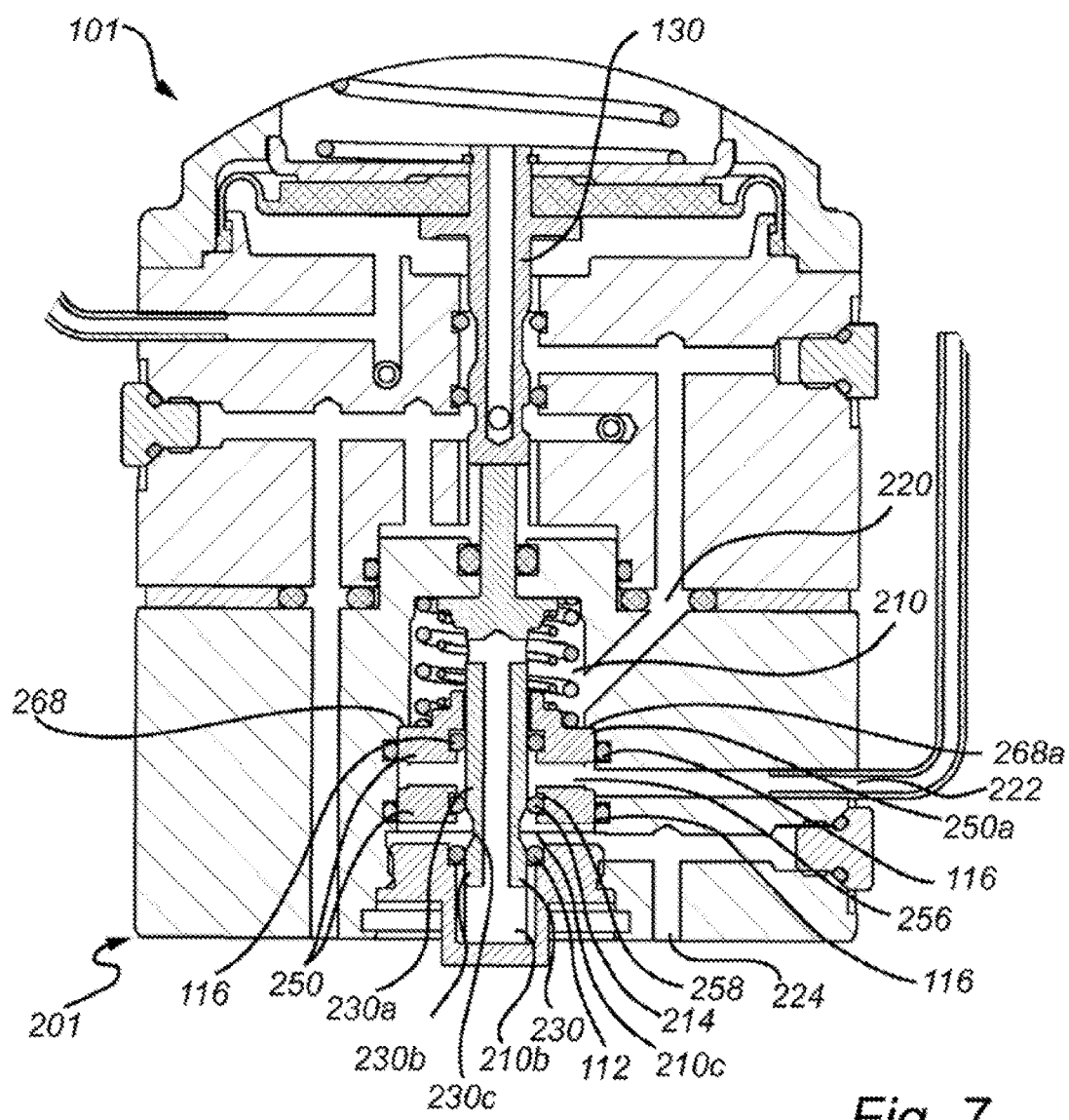

If the pressure difference between the static pressure of fluid in the first fluid inlet 120, and the static pressure of fluid in the second fluid inlet 122, increases, e.g. the static pressure of fluid in the second fluid inlet 122 increases and/or the static pressure of fluid in the first fluid inlet 120 decreases, the second force applied to the separating element 140 (indicated in FIG. 2a) may overcome the combined force of the first force and the pilot spring force, and the separating element 140 will be moved further into the pilot spring chamber 163 (indicated in FIG. 2a). Thus, the valve rod 130 will be moved from its first position to its second position, the second position of the valve rod 130 is shown in FIGS. 5-7. In the second position, the second fluid inlet 122, the second chamber portion 110b and the first pilot valve fluid outlet 124 are in fluid communication with each other, while the first fluid inlet 120 is restricted from being in fluid communication with the first pilot valve fluid outlet 124 by the valve rod 130 fluidly sealing against the first sealing element 112. In other words, the first chamber portion 110a is fluidly sealed from the third chamber 110c portion by a sealing contact between the valve rod 130 and the first sealing element 112, According to at least one example embodiment the third valve rod portion 130c is arranged to be at least partly located in the second chamber portion 110b such that the second fluid inlet 122 is in fluid communication with the first pilot valve fluid outlet 124 via the second and third chamber portions 110b, 110c, and the first valve rod portion 130a is arranged to be at least partly located in both the first chamber portion 110a and the third chamber portion 110c such that the first fluid inlet 120 is restricted from being in fluid communication with the first pilot valve fluid outlet 124.

Figure 4:
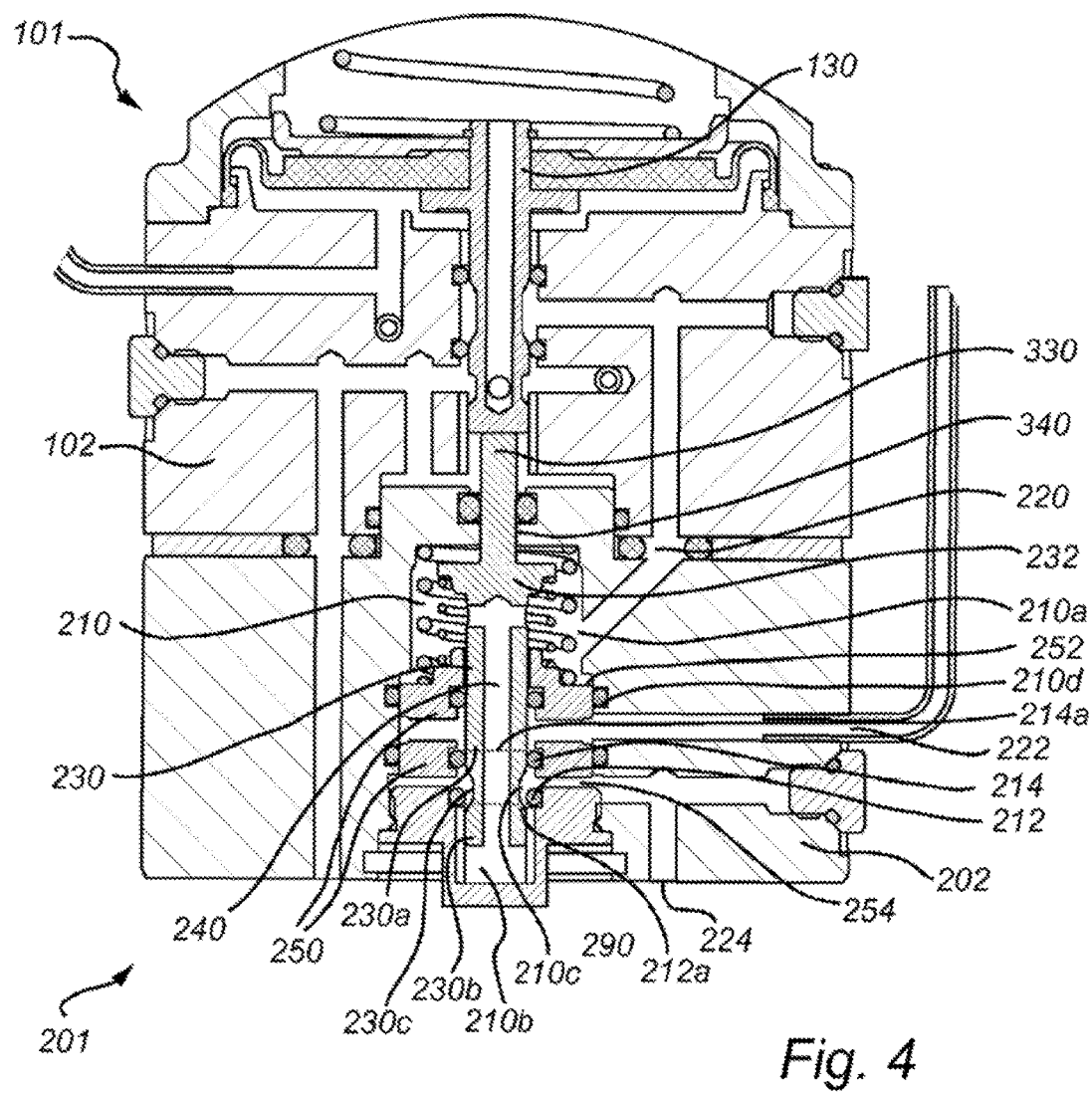

In FIG. 4, an intermediate position of the valve rod 130 being in between its first and second position is illustrated. Here, neither the first fluid inlet 120, nor the second fluid inlet 122 is in fluid communication with the first pilot valve fluid outlet 124, as fluid flow from both inlets 120, 122 are restricted by the valve rod 130, and the first and the second sealing elements 112, 114. The intermediate position of the valve rod 130 may occur after the valve rod 130 has been in its first position, and hence fluid in the first pilot valve fluid outlet 124 stem from fluid from the first fluid inlet 120, although the first fluid inlet 120 is not in fluid communication with the first pilot valve fluid outlet 124. The intermediate position of the valve rod 130 may also occur after the valve rod 130 has been in its second position, and hence fluid in the first pilot valve fluid outlet 124 stem from fluid from the second fluid inlet 122, although the second fluid inlet 122 is not in fluid communication with the first pilot valve fluid outlet 124.

The second pilot valve part 201 in FIG. 2b is the same as the second pilot valve part in FIGS. 3-7, and the structure of the second pilot valve part 201 will now be described with reference to FIGS. 3-7.

As shown in FIG. 3, the second pilot valve part 201 in FIGS. 3-7 comprises a second pilot valve body 202 having a compartment 210, a low pressure fluid inlet 220 for receiving fluid from the first pilot valve part 101 via the first pilot valve fluid outlet 124, and providing fluid to the compartment 210. The second pilot body 202 further comprises a high pressure fluid inlet 222 for providing fluid to the compartment 210, and a fluid outlet 224 for receiving fluid from the compartment 210 and providing fluid to a piloted valve (as shown in FIG. 1). The compartment 210 is defined at least partly by a first end wall section 264, a second end wall section 266 arranged opposite to and facing the first end wall section 264, and a lateral wall section 268 arranged between the first and second end wall sections 264, 266.

A valve stem 230 is at least partly located inside the compartment 210. The valve stem 230 is connected to the valve rod 130 of the first pilot valve part 101 and moves together with the valve rod 130 in order to control fluid flow from the low pressure fluid inlet 220 to the fluid outlet 224 via the compartment 210, and configured to control fluid flow from the high pressure fluid inlet 222 to the fluid outlet 224 via the compartment 210.

As illustrated in FIG. 3, the second pilot valve part 201 further comprises a movable control body 250 comprised in, and movable within, the compartment 210. The movable control body 250 comprises a primary contacting area 252, a secondary contacting area 254 arranged opposite to the primary contacting area 252, and a cavity 256 for receiving fluid from the high pressure fluid inlet 222. The cavity 256 is arranged within the movable control body 250 between the primary and secondary contacting areas 252, 254. The movable control body 250 further comprises a through hole 258 extending from the primary contacting surface 252 to the secondary contacting area 254. The through hole 258 is for receiving the valve stem 230 and the valve stem 230 is thus movable within the movable control body 250. As shown in FIG. 2b, the valve stem 230 may extend through the through hole 258.

The compartment 210 also houses a first spring 260 and a second spring 262, indicated in FIG. 3. The first spring 260 is arranged between the primary contacting area 252 of the movable control body 250 and the first end wall section 264 of the compartment 210. Hereby the first spring 260 may exert a first spring force on the movable control body 250 via the primary contacting area 252. According to at least one example embodiment, the first spring 260 is attached to the movable control body 250.

The second spring 262 is arranged between a head 232 of the valve stem 230 and the primary contacting area 252 of the movable control body 250. Hereby the second spring 262 may exert a second spring force on the movable control body 250 via the primary contacting area 252.

As illustrated in FIGS. 3-7, and indicated in FIG. 4, the valve stem 230 is connected to the valve rod 130 by a combined part 330, which extends through the second pilot valve body 202 to the first pilot valve body 102 in a combining through hole 340. The head 232 of the valve stem 230 has a cross section which is larger than the combining through hole 340 for restricting the movement of the valve stem 230 into the combining through hole 340.

In FIGS. 3-7, and as indicted in FIG. 4, the second pilot valve part 201 comprises a first sealing member 212 in the form of an o-ring 212, and a second sealing member 214 also in the form of an o-ring 214. The first sealing member 212 is arranged within the compartment 210 and a first geometrical compartment cross section 212a of the compartment 210 tangents the first sealing member 212. The second sealing member 214 is arranged within the compartment 210 and a second geometrical compartment cross section 214a of the compartment 210 tangents the second sealing member 214. The compartment 210 comprises a first compartment portion 210a defined at least partly by the primary contacting area 252 of the movable control body 250, the first end wall section 264 (indicated in FIG. 3) of the compartment 210 and the low pressure fluid inlet 220, a second compartment portion 210b defined at least partly by the second end wall section 266 and a portion of the lateral wall section 268 extending between the second end wall section 266 and a third compartment portion 210c. The third compartment portion 210c comprising the first and the second sealing members 212, 214 and being at least partly defined by the first geometrical compartment cross section 212a and the second geometrical compartment cross sections 212a, 214a and the fluid outlet 224. The first compartment portion 210a is arranged to receive fluid from the low pressure fluid inlet 220, and the second compartment portion 210b is arranged to be in fluid communication with the first compartment portion 210a via a valve stem conduit 240 within the valve stem 230 extending through the movable control body 250. The third compartment portion 210c is arranged to be in fluid communication with the fluid outlet 224. Hereby, fluid in the first compartment portion 210a may exert a pressure on the primary contacting area 252 for applying a force to the movable control body 250, and fluid in the third compartment portion 210c may exert a pressure on the secondary contacting area 254 for applying a force to the movable control body 250.

The movable control body 250 is arranged inside the compartment 210, within a fourth compartment potion 210d, such that the primary contacting area 252 faces the first compartment portion 210a and the secondary contacting area 254 faces the third compartment portion 210c.

The valve stem 230 in FIGS. 3-7 comprises at least a first valve stem portion 230a, a second valve stem portion 230b, and a third valve stem portion 230c arranged between the first and second valve stem portions 230a, 230b, as indicated in FIG. 4. Each of the first and second valve stem portions 230a, 230b has a diameter larger than a diameter of the third valve stem portion 230c. The third valve stem portion 230c may have a waist shape, or hour-glass shape, as shown in FIGS. 3-7, while the first and the second valve stem portions 230a, 230b may have a circular cross section with a constant diameter.

The function of the pilot valve arrangement 301 and second pilot valve part 201 in combination with the first pilot valve part 101 will now be described in more detail with reference to FIGS. 3-7.

The functioning of the first pilot valve part 101 is explained above with reference to FIG. 2a, and FIGS. 3-7. Since the valve rod 130 of the first pilot valve part 101 is connected to the valve stem 230 of the second pilot valve part 201, the fluid flow inside the second pilot valve part 201 is at least partly determined by the position of the valve rod 130, and the pressure difference between the first and second fluid inlets 120, 122.

As illustrated in FIGS. 3-5, the second pilot valve part 201 is in its first state, and provides for a first fluid flow path 290, shown in FIG. 4, within the compartment and the second compartment portion 210a, to enable the low pressure fluid inlet 220 to be in fluid communication with the fluid outlet 224. Hence, the low pressure fluid inlet 220 is in fluid communication with the fluid outlet 224 via the first compartment portion 210a, the valve stem fluid conduit 240 within the valve stem 230, the second compartment portion 210b, the first fluid flow path 290 and the third compartment portion 210c.

In other word, in the first state, the first valve stem portion 230a is arranged to fluidly seal against the inner wall defining the through hole 258 (indicated in FIG. 3) in the movable control body 250 in order for fluid in the cavity 256 in the movable control body 250 to be restricted from being in fluid communication with the third compartment portion 230c. Furthermore, the third valve stem portion 230c is arranged to be at least partly located in the third and second compartment portions 210b, 210c in order for fluid in the second compartment portion 210b to be in fluid communication with the third compartment portion 210c via the first fluid flow path 290. The first fluid path 290 being at least partly defined by at least a part of the lateral wall section 268 of the compartment 210 and/or the first sealing element 212 and at least a part of the third valve stem portion 230c.

That is, in the first state, the valve stem 230 is arranged to fluidly seal against the inner wall defining the through hole 258 (indicated in FIG. 3) in the movable control body 250 by the second sealing member 214, such that the high pressure fluid inlet 220 is restricted from being in fluid communication with the fluid outlet 224.

As illustrated in FIG. 6, the valve rod 130 of the first pilot valve part 101 is in its second position and the separating element 140 is as far into the pilot spring chamber 163 as possible. Here, the valve stem 230 is as close to the first pilot valve part 101 as possible and the head 232 of the valve stem 230 is in contact with the end wall section 264. Thus, the valve stem 230 provides for a second fluid flow path 292, indicated in FIG. 6, within the compartment 210 to enable the high pressure fluid inlet 222 to be in fluid communication with the fluid outlet 224. Hence, the high pressure fluid inlet 222 is in fluid communication with the fluid outlet 224 via the cavity 256 of the movable control part 250, the second fluid flow path 292, and the third compartment portion 210c.

In other words, in the second state, the second valve stem portion 230b is arranged to fluidly seal against the lateral wall section 268 of the compartment 210 by the first sealing member 212 in order for fluid in the second compartment portion 210b to be restricted from being in fluid communication with the third compartment portion 210c. Hence, the first fluid flow path 290 is closed. Furthermore the third valve stem portion 230c is arranged to be at least partly located in the cavity 256 and the third compartment portion 210c in order for fluid in the cavity 256 of the movable control body 250 to be in fluid communication with the third compartment portion 210c via the second fluid flow path 292. The second fluid path 292 being at least partly defined by at least a part of the inner wall defining the through hole 258 (indicated in FIG. 3) in the movable control body 250 and/or the second sealing member 214, and at least a part of the third valve stem portion 230c.

That is, in the second state, the valve stem 230 is arranged to fluidly seal against the lateral wall section 268 of the compartment 210 by the first sealing member 212, such that the low pressure fluid inlet 220 is restricted from being in fluid communication with the fluid outlet 224. Hence, the fluid path 290 is closed as the second valve stem portion 230b fluidly seals the second compartment portion 210b from the third compartment portion by sealing against the first sealing member 212.

The movable control body 250 is allowed to be moved from a primary position, as shown in FIGS. 3-6 where the movable control body 250 still allows for a movement further towards the first end wall section 264, to a secondary position, as shown in FIG. 7 where the movable control body 250 has been moved as far as possible towards the first end wall section 264. Here, a shoulder part 250a of the movable control body 250 rests against a recess 268a in the later wall section 268 of the compartment 210. As illustrated in FIG. 7, the valve rod 130 and the valve stem 230 is in the same position as in FIG. 6, however the movable control body 250 has moved from its primary position, as shown in FIGS. 3-6, to its secondary position. The movement between the primary position and the secondary position is due to that a first force applied to the primary contacting area 252 by the first and second springs 260, 262 and fluid in the first compartment portion 210a is smaller than a second force applied to the secondary contacting area 254 by fluid in the third compartment portion 210c. This state is referred to as the second pilot valve part 201 being in its third state.

In the third state, the valve stem 230 is arranged to fluidly seal against the inner wall defining the through hole 258 in the movable control body 250 such that the high pressure fluid inlet 222 is restricted from being in fluid communication with the fluid outlet 224, and the valve stem 230 is arranged to fluidly seal against the lateral wall section 268 of the compartment 210 such that the low pressure fluid inlet 220 is restricted from being in fluid communication with the fluid outlet 224. Hence, both the first and second fluid contact paths, 290, 292 (indicated in FIGS. 4 and 6) are closed.

In other words, in the third state, the first valve stem portion 230a is arranged to fluidly seal against the inner wall defining the through hole 258 in the movable control body 250 by the second sealing member 214 in order for fluid in the cavity 256 to be restricted from being in fluid communication with the third compartment portion 210c. Furthermore, the second valve stem portion 230b is arranged to fluidly seal against the lateral wall section 268 of the compartment 210 by the first sealing member 212, in order for fluid in the second compartment portion 210b to be restricted from being in fluid communication with the third compartment portion 210c. Hereby, none of the low pressure or high pressure fluid inlets 220, 222 are in fluid communication with the fluid outlet 224, i.e. the first and second fluid flow paths 290, 292 (indicated in FIGS. 4 and 6) are closed.

As also illustrated in FIG. 2-7, further sealing members 116 indicated in FIG. 7, are arranged within the second pilot valve body 202, e.g. for sealing fluid from the high pressure fluid inlet 222 and fluid the cavity 256 within the movable control body 250, from the first compartment portion 210a.

The pilot valve arrangement 301 will now be described when used together with a piloted valve, similar to the manner of the pilot valve 1 and the piloted valve 3 as shown in FIG. 1. For the below examples, it is assumed that the static pressure of fluid in the first fluid inlet 120 is smaller than the static pressure of fluid in the second fluid inlet 122, and that the static pressure of fluid in the second fluid inlet 122 is smaller than the static pressure of fluid in the high pressure fluid inlet 222. Furthermore, it is assumed that the piloted valve 3 is a normally open valve, receiving fluid with a static pressure of e.g. that of the second fluid inlet 122, and delivering fluid with a static pressure of e.g. that of the first fluid inlet 120. However, the pilot valve arrangement 301 or the first pilot valve part 101 may operate a normally closed piloted valve.

As illustrated in FIG. 3, when the valve rod 130 is in its first position, and the second pilot valve part 201 is its first state, fluid from the first fluid inlet 120 will be in fluid communication with the fluid outlet 224. Hence, the piloted valve 3 (shown in FIG. 1) will receive a control feed in fluid communication with the first fluid inlet 120. Thus, the piloted valve will be fully opened and/or be moved towards a fully open position.

When the pressure difference between the first fluid inlet 120 and the second fluid inlet 122 increases, e.g. by the static pressure in the second fluid inlet 122 increases and/or the static pressure of fluid in the first fluid inlet 120 decreases, the valve rod 130 will be moved from its first position to its second position. Hereby, fluid from the second fluid inlet 122 will be in fluid communication with the first pilot valve fluid outlet 124, and the low pressure fluid inlet 220 of the second pilot valve part 201. However, the second pilot valve part 201 is still in its first state and allows for a fluid communication between the low pressure fluid inlet 220 and the fluid outlet 224, as illustrated in FIG. 5.

When the valve rod 130 is in its second position, and the second pilot valve part 201 is its first state, fluid from the second fluid inlet 122 will be in fluid communication with the fluid outlet 224. Hence, the piloted valve (shown in FIG. 1) will receive a control feed in fluid communication with the second fluid inlet 122. Thus, the piloted valve will begin to close or be closed.

When the pressure difference between the first fluid inlet 120 and the second fluid inlet 122 further increases, e.g. by the static pressure in the second fluid inlet 122 further increases and/or the static pressure of fluid in the first fluid inlet 120 further decreases, the separating element 140 will be moved as far as possible within the pilot spring chamber 163. Still, fluid from the second fluid inlet 122 will be in fluid communication with the first pilot valve fluid outlet 124, and the low pressure fluid inlet 220 of the second pilot valve part 201. However, the second pilot valve part 201 will now be moved into its second state and allow for a fluid communication between the high pressure fluid inlet 222 and the fluid outlet 224, as illustrated in FIG. 6.

When the valve rod 130 is in its second position, and the second pilot valve part 201 is its second state, fluid from the high pressure fluid inlet 222 will be in fluid communication with the fluid outlet 224. Hence, the piloted valve 3 (shown in FIG. 1) will receive a control feed in fluid communication with the high pressure fluid inlet 222. Thus, the piloted valve will either be closed in faster manner, or seal better when the piloted valve is fully closed, compared to the case when fluid from the second fluid inlet 122 is in fluid communication with the fluid outlet 224.

If the conditions for the second pilot valve part to be in its third state are fulfilled (as explained above and shown in FIG. 7), the movable control body 250 is moved to its secondary position and none of the fluid inlets 220, 222 of the second pilot valve part 201 are allowed to be in fluid communication with the fluid outlet 224.

If the static pressure of fluid in the high pressure inlet is referred to as P0, fluid from the second fluid inlet 122 in the first compartment portion 210a is referred to as P1, the spring force of the first spring 260 is referred to Fs, and an inner and outer diameter of the first spring 260 in contact with the primary contacting area 252 are referred to as d and D, respectively, and the flow through the piloted valve (shown in FIG. 1) is denoted Q, the valve constant of the piloted valve denoted Kv, and the pressure drop due to e.g. accessories, pipes and heat exchangers in the system is denoted Dp, the following relationship applies:

$$P0_{LIMIT}=P1+4*Fs/(pi*(D^2-d^2))+Dp$$

$$P0_{MAX}=P1+Q^2/Kv^2$$

where $P0_{LIMIT}$ is the static pressure of the fluid in the fluid outlet when the second pilot valve is in its third state (i.e. no fluid communication between the high pressure fluid inlet and the fluid outlet) and $P0_{MAX}$ is the maximum static pressure available from the fluid distribution system, and hence the static pressure of fluid at the high pressure fluid inlet. Hence, the amplified piloted valve is prevented from oscillating due to the difference in pressure between the $P0_{LIMIT}$ and the $P0_{MAX}$.

Figure 8:
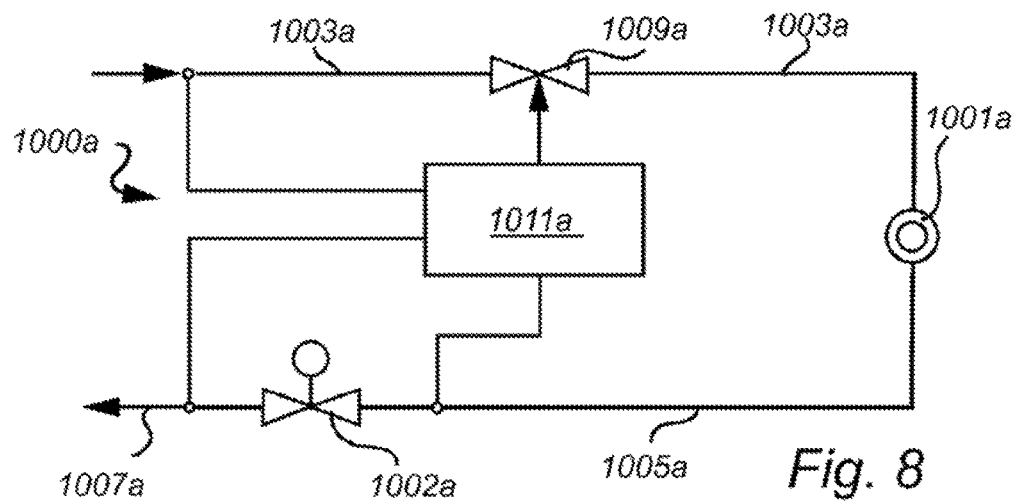
FIG. 8 is a schematic illustration of a fluid distribution system with a pilot valve arrangement according to at least one example embodiment of the inventive concept.
Figure 9:
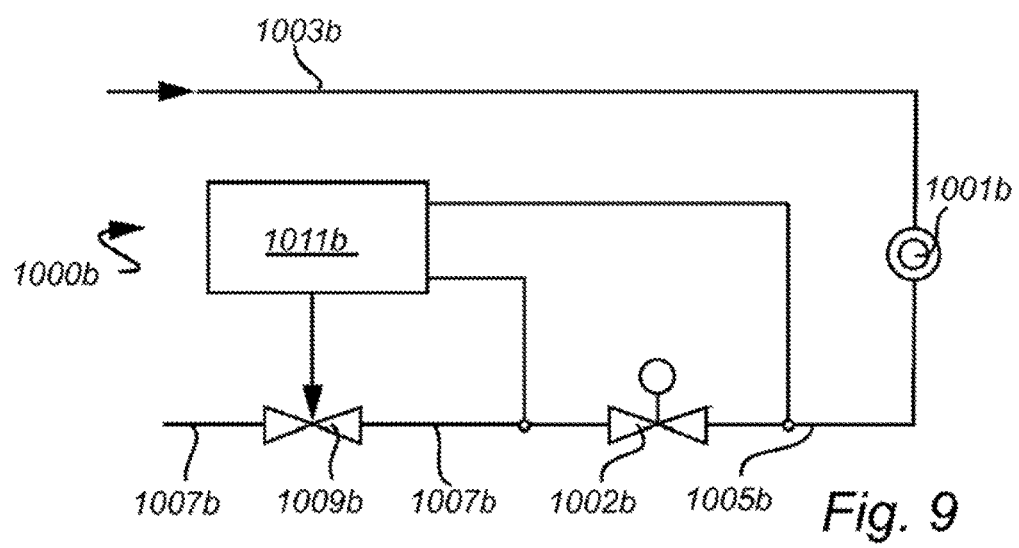
FIG. 9 is a schematic illustration of a fluid distribution system and a pilot valve arrangement according to at least one example of the inventive concept.
Figure 10:
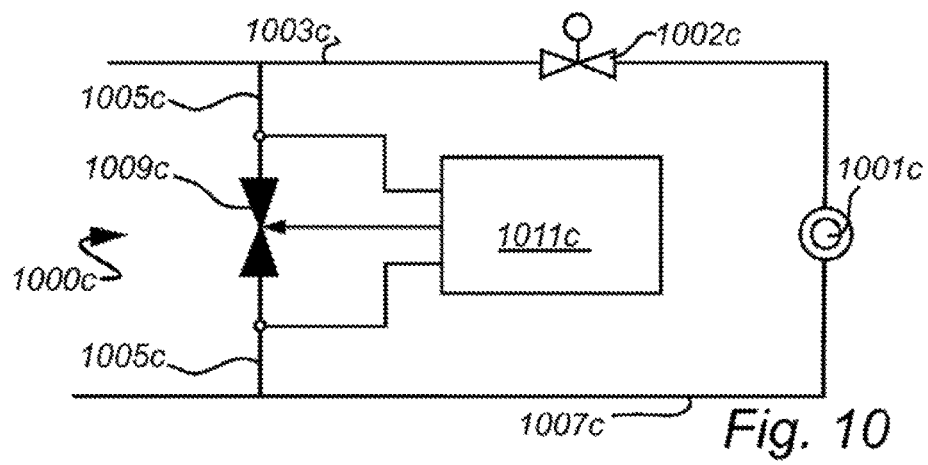
FIG. 10 is a schematic illustration of a fluid distribution system and a pilot valve arrangement according to at least one example of the inventive concept.

In FIGS. 8-10, schematic illustrations of different fluid distribution systems for supplying fluid to a load are shown.

In FIG. 8, the fluid distribution system 1000a comprises a load 1001a, a control unit 1002a, a supply line 1003a for supplying fluid to the load 1001a, an intermediate line 1005a for transporting fluid from the load 1001a to the control unit 1002a, a return line 1007a for transporting fluid from the control unit 1002a. A static pressure of fluid in the supply 1003a line is higher than a static pressure of fluid in the intermediate line 1005a, and the static pressure of fluid in the intermediate line 1005a is higher than a static pressure of fluid in the return line 1007a.

As shown in FIG. 8, the piloted valve 1009a or main valve 1009a is arranged on the supply line 1003a together with a pilot valve arrangement 1011a as described above (indicated as 301 in e.g. FIG. 2b) for piloting the main valve 1009a. Furthermore, the first fluid inlet (indicated as 120 in FIGS. 2-7) to the pilot valve arrangement 1011a is fluidly connected to the return line 1007a, and the high pressure inlet (indicated as 222 in FIGS. 2-7) is fluidly connected to the supply line 1003a. The second fluid inlet (indicated as 122 in FIGS. 2-7) to the pilot valve arrangement 1011a is fluidly connected to the intermediate line 1005a. The pilot valve arrangement 1011a facilitates in keeping a constant pressure drop over the control unit 1002a and in the sealing of the main valve 1009a by allowing for the high pressure from the supply line 1003a to be fed to the main valve.

By referring to the two equations above, in FIG. 8, Dp represents the pressure drop over the load 1001a, Q represents the flow in the supply line 1003a over the piloted valve 1009a and Kv is the valve constant of the piloted valve 1009a.

In FIG. 9, the fluid distribution system 1000b comprises a load 1001b, a control unit 1002b, a supply line 1003b for supplying fluid to the load 1001b, an intermediate line 1005b for transporting fluid from the load 1001b to the control unit 1002b, a return line 1007b for transporting fluid from the control unit 1002b. A static pressure of fluid in the supply 1003b line is higher than a static pressure of fluid in the intermediate line 1005b, and the static pressure of fluid in the intermediate line 1005b is higher than a static pressure of fluid in the return line 1007b.

As shown in FIG. 9, the piloted valve 1009b or main valve 1009b is arranged on the return line 1007b together with a pilot valve 1011b, here no second pilot valve part (indicated as 201 in FIGS. 2-7) is necessary and the pilot valve or the first pilot valve part (indicated as 1 in FIGS. 1 and 101 in FIGS. 2-7) is sufficient for controlling the main valve 1009b. Here, the first fluid inlet (indicated as 120 in FIGS. 2-7) to the pilot valve 1011b is fluidly connected to the return line 1007b and the second fluid inlet (indicated as 122 in FIGS. 2-7) is fluidly connected to the intermediate line 1005b. The pilot valve 1011b facilitates in keeping the pressure drop over the control unit 1002b constant.

In FIG. 10, the fluid distribution system 1000c comprises a load 1001c, a control unit 1002c, a supply line 1003c for supplying fluid to the load 1001c via the control unit 1002c, a return line 1007c for transporting fluid away from said load 1001c, a by-pass line 1005c for transporting fluid between the supply line 1003c and the return line 1007c. A static pressure of fluid in the supply 1003b line is higher than a static pressure of fluid in the return line 1007b.

As shown in FIG. 10, a piloted valve 1009c or main valve 1009c is arranged on the by-pass line 1005c together with a pilot valve 1011c, here no second pilot valve part (indicated as 201 in FIGS. 2-7) is necessary and the pilot valve or the first pilot valve part (indicated as 1 in FIGS. 1 and 101 in FIGS. 2-7) is sufficient for controlling the main valve 1009c. Here, the first fluid inlet (indicated as 120 in FIGS. 2-7) to the pilot valve 1011c is fluidly connected to the return line 1007c via the intermediate line 1005c and the second fluid inlet (indicated as 122 in FIGS. 2-7) is fluidly connected to the supply line 1003c via the intermediate line 1005c. The pilot valve facilitates in keeping a constant pressure drop over the main valve 1009c.

In FIGS. 8-9, the main valve 1009a, 1009b is normally open, and in FIG. 10, the main valve 1009c is normally closed.

It should be noted that the control unit 1002a-c in each of FIGS. 8-10 is a symbolic component representing any component or combination of components which provides for a controllable fluid flow, e.g. a control valve 1002a-c, a complete branch 1002a-c of e.g. lines, conduits, pipes and/or heat exchangers and/or another load 1002a-c.

According to at least one example embodiment, the pilot spring may be an adjustable pilot spring. Hereby, the pilot valve and the piloted valve may be arranged in a fluid distribution system where the pressure drop over the control unit 1002a-c varies. For example, a first pilot spring may be used in a fluid distribution system where the pressure drop over the control unit 1002a-c is between 10 kPa and 50 kPa, a second pilot spring may be used in a fluid distribution system where the pressure drop over the control unit 1002*a-c* is between 30 kPa and 150 kPa, and a third pilot spring may be used in a fluid distribution system where the pressure drop over the control unit 1002*a-c* is between 80 kPa and 400 kPa.

While the pilot valve, the pilot valve arrangement, and the various fluid distribution systems are illustrated as having a particular configuration, one skilled on the art will recognize that such pilot valve, pilot valve arrangement and fluid distribution systems may include more or fewer components of different types. Indeed, one skilled in the art will recognize that the fluid distribution systems illustrated in FIGS. 8-10 have been constructed to illustrate various aspects of the present inventive concept, and therefore is presented by way of illustration and not by way of limitation. For example the present inventive concept is not limited to the specific arrangement of external and internal fluid paths fed to the first and second fluid inlets, and the high pressure fluid inlet, as shown here, but the first fluid inlet may be fed from an internal flow of the piloted valve 1009*a-c*, and/or the second fluid inlet, and/or the high pressure fluid inlet may be fed from an external line somewhere else from the fluid distribution system. The external flow may e.g. derive from somewhere further upstream in the fluid distribution system.

The invention claimed is:

1. A pilot valve arrangement comprising a first pilot valve part and a second pilot valve part, said first pilot valve part comprising:
   a first pilot valve body comprising: at least a first fluid inlet and a first pilot valve fluid outlet;
   said second pilot valve part comprising:
   a second pilot valve body comprising: a compartment, a low pressure fluid inlet for receiving fluid from the first pilot valve fluid outlet and providing fluid to said compartment, a high pressure fluid inlet for providing fluid to said compartment, and a fluid outlet for receiving fluid from said compartment and providing fluid to a piloted valve;
   a valve stem arranged at least partly inside said compartment, said valve stem being configured to control fluid flow from said low pressure fluid inlet to said fluid outlet via said compartment, and configured to control fluid flow from said high pressure fluid inlet to said fluid outlet via said compartment;
   wherein said second pilot valve part in a first state provides for a first fluid flow path within said compartment to enable said low pressure fluid inlet to be in fluid communication with said fluid outlet via said first fluid flow path, and wherein said second pilot valve part in a second state provides for a second fluid flow path within said compartment to enable said high pressure fluid inlet to be in fluid communication with said fluid outlet via said second fluid flow path, said second fluid flow path being different from said first fluid flow path.

2. A pilot valve arrangement according to claim 1, further comprising a movable control body comprised in, and movable within, said compartment,
   said movable control body comprising a primary contacting area, a secondary contacting area arranged opposite to said primary contacting area, a cavity for receiving fluid from said high pressure fluid inlet, said cavity being arranged within said movable control body between said primary and secondary contacting areas, and a through hole for receiving said valve stem such that said valve stem is movable within said through hole, said through hole extending from said primary contacting area to said secondary contacting area, wherein
   when said second pilot valve part is in said first state, said valve stem is arranged to fluidly seal against the inner wall at least partly defining said through hole in said movable control body such that said high pressure fluid inlet is restricted from being in fluid communication with said fluid outlet, and
   when said second pilot valve part is in said second state, said valve stem is arranged to fluidly seal against at least a part of the lateral wall section of said compartment such that said low pressure fluid inlet is restricted from being in fluid communication with said fluid outlet.

3. A pilot valve arrangement according to claim 2, further comprising a first spring arranged at least partly inside said compartment, and wherein said first spring is arranged between said primary contacting area of said movable control body and the first end wall section of said compartment facing said primary contacting area, in order for said first spring to exert a first spring force on said movable control body.

4. A pilot valve arrangement according to claim 3, further comprising a second spring arranged at least partly inside said compartment, wherein said second spring is arranged between a head of said valve stem and said primary contacting area of said movable control body in order for said second spring to exert a second spring force on said movable control body.

5. A pilot valve arrangement according to claim 4, wherein said movable control body is configured to be moved from its primary position to its secondary position when a first force applied to the primary contacting area by said first and second springs and fluid in said first compartment portion is smaller than a second force applied to said secondary contacting area by fluid in said third compartment portion.

6. A pilot valve arrangement according to claim 2, wherein said movable control body is arranged in a primary position when said second pilot valve part is in its first and second states, and arranged in secondary position when said second pilot valve part is in a third state, said third state being defined by that
   said valve stem is arranged to fluidly seal against the inner wall at least partly defining said through hole in said movable control body such that said high pressure fluid inlet is restricted from being in fluid communication with said fluid outlet, and
   said valve stem is arranged to fluidly seal against at least a part of the lateral wall section of said compartment such that said low pressure fluid inlet is restricted from being in fluid communication with said fluid outlet.

7. A pilot valve arrangement according to claim 6, wherein when said second pilot valve part is in its first state:
   said first valve stem portion is arranged to fluidly seal against the inner wall at least partly defining said through hole in said movable control body in order for fluid in said cavity in said movable control body to be restricted from being in fluid communication with said third compartment portion, and
   said third valve stem portion is arranged to be at least partly located in said third compartment portion in order for fluid in said second compartment portion to be in fluid communication with said third compartment portion via said first fluid flow path, said first fluid path being at least partly defined by at least a part of the lateral wall section of said compartment and at least a part of said third valve stem portion;

and wherein when said second pilot valve part is in its second state:

said second valve stem portion is arranged to fluidly seal against the lateral wall section of said compartment in order for fluid in said second compartment portion to be restricted from being in fluid communication with said third compartment portion, and said third valve stem portion is arranged to be at least partly located in said third compartment portion in order for fluid in said cavity of said movable control body to be in fluid communication with said third compartment portion via said second fluid flow path, said second fluid path being at least partly defined by at least a part of the inner wall defining said through hole in said movable control body and at least a part of said third valve stem portion;

and wherein when said second pilot valve part is in its third state:

said first valve stem portion is arranged to fluidly seal against the inner wall at least partly defining said through hole in said movable control body in order for fluid in said cavity to be restricted from being in fluid communication with said third compartment portion, and said second valve stem portion is arranged to fluidly seal against the lateral wall section of said compartment in order for fluid in said second compartment portion to be restricted from being in fluid communication with said third compartment portion, such that none of the low pressure and high pressure fluid inlets are in fluid communication with said fluid outlet.

8. A pilot valve arrangement according to claim 2, further comprising a first sealing member and a second sealing member arranged inside said compartment, and wherein said compartment comprises:

a first end wall section, a second end wall section arranged opposite to and facing said first end wall section, and a lateral wall section arranged between said first and second end wall sections, a first compartment portion being at least partly defined by said primary contacting area of said movable control body and the first end wall section of said compartment facing said primary contacting area, a second compartment portion being at least partly defined by said second end wall section and a portion of the lateral wall section extending between said second end wall section and said first sealing member, and a third compartment portion comprising said first and second sealing member, and being at least partly defined by a portion of the lateral wall section extending between said first and second sealing members, and said secondary contacting area of said movable control body, said first compartment portion being arranged to receive fluid from said low pressure fluid inlet to allow for fluid in said first compartment portion to exert a force on said primary contacting area, said second compartment portion being arranged to be in fluid communication with said first compartment portion, and said third compartment portion being arranged to be in fluid communication with said fluid outlet to allow for fluid in said third compartment portion to exert a force on said secondary contacting area.

9. A pilot valve arrangement according to claim 8, wherein said valve stem comprises a valve stem conduit for fluidly connecting said first compartment portion with said second compartment portion.

10. A pilot valve arrangement according to claim 1, wherein said valve stem comprises at least a first valve stem portion, a second valve stem portion, and a third valve stem portion arranged between said first and second valve stem portions, wherein each of said first and second valve stem portions has a diameter larger than a diameter of said third valve stem portion.

11. A pilot valve arrangement according to claim 1, wherein said first pilot valve part further comprises:

a chamber, wherein said at least first fluid inlet is arranged to provide fluid to said chamber, and wherein said first pilot valve fluid outlet is arranged to receive fluid from said chamber, and a valve rod configured to control fluid flow from said at least first fluid inlet to said pilot valve fluid outlet via said chamber, wherein said valve rod is connected to, and movable with, said valve stem.

12. A pilot valve arrangement according to claim 11, wherein said first pilot valve part further comprises:

a second fluid inlet arranged inside said first pilot valve body, said second fluid inlet being arranged to provide fluid to said chamber, and wherein said valve rod is arranged at least partly inside said chamber, said valve rod being configured to control fluid flow from said first fluid inlet to said first pilot valve fluid outlet via said chamber, and configured to control fluid flow from said second fluid inlet to said first pilot valve fluid outlet via said chamber;

a separating element being connected to, and movable with said valve rod, said separating element having a first fluid contacting area, and a second fluid contacting area arranged on an opposite side to said first fluid contacting area, said first fluid contacting area being configured to be in fluid communication with said first fluid inlet for applying a first force to said separating element, and said second fluid contacting area being configured to be in fluid connection with said second fluid inlet for applying a second force to said separating element;

wherein a difference between the first and second forces controls the movement of the separating element and the valve rod in such a way that said valve rod in at least a first position provides for a fluid connection between said first fluid inlet and said first pilot valve fluid outlet; and in at least a second position provides for a fluid connection between said second fluid inlet and said first pilot valve fluid outlet.

13. A fluid distribution system comprising a pilot valve arrangement according to claim 1, a first fluid conduit for guiding a fluid to said at least first fluid inlet, a second fluid conduit for guiding a fluid to said high pressure fluid inlet, and a third fluid conduit for guiding fluid away from said fluid outlet, wherein a static pressure of fluid in said first fluid conduit is lower compared to a static pressure of fluid in said second fluid conduit.

14. A fluid distribution system according to claim 13, said fluid distribution system being arranged to supply fluid to a load, said fluid distribution system comprising:

said load,
a control unit,
a supply line for supplying fluid to said load, an intermediate line for transporting fluid from said load to said control unit,
a return line for transporting fluid from said control unit,
a main valve arranged on said supply line, and
the pilot valve arrangement piloting said main valve,
wherein a static pressure of fluid in said supply line is higher than a static pressure of fluid in said intermediate line, and wherein a static pressure of fluid in said intermediate line is higher than a static pressure of fluid in said return line,
wherein said first fluid inlet to said pilot valve arrangement is fluidly connected to said return line and said high pressure inlet is fluidly connected to said supply line.

15. A fluid distribution system according to claim 14, wherein said second fluid inlet to said pilot valve arrangement is fluidly connected to said intermediate line.

* * * * *